United States Patent
Pender et al.

(10) Patent No.: US 11,290,454 B2
(45) Date of Patent: *Mar. 29, 2022

(54) LINKING CHANNEL-SPECIFIC SYSTEMS WITH A USER AUTHENTICATION HUB TO PROVIDE OMNI-CHANNEL USER AUTHENTICATION

(71) Applicant: Bank of America Corporation, Charlotte, NC (US)

(72) Inventors: Mark A. Pender, Rockville Center, NY (US); Daniel L. Carpenter, Charlotte, NC (US); Kapil Pruthi, Bothell, WA (US); Xianhong Zhang, Issaquah, WA (US); Apeksh M. Dave, Weddington, NC (US); Elizabeth Votaw, Potomac, MD (US); Andrew T. Keys, Albany, OR (US)

(73) Assignee: Bank of America Corporation, Charlotte, NC (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/851,747

(22) Filed: Apr. 17, 2020

(65) Prior Publication Data
US 2020/0244661 A1 Jul. 30, 2020

Related U.S. Application Data

(63) Continuation of application No. 15/155,044, filed on May 15, 2016, now Pat. No. 10,666,654.

(51) Int. Cl.
*G06F 21/00* (2013.01)
*H04L 29/06* (2006.01)

(52) U.S. Cl.
CPC ............... *H04L 63/0892* (2013.01)

(58) Field of Classification Search
CPC .................................................. H04L 63/0892
(Continued)

(56) References Cited

U.S. PATENT DOCUMENTS 8,255,971 B1 * 8/2012 Webb ................. G06Q 20/4016
726/1
2006/0156385 A1 7/2006 Chiviendacz et al.
(Continued)

OTHER PUBLICATIONS

Jan. 31, 2019 U.S. Non-Final Office Action—U.S. Appl. No. 15/155,044.
(Continued)

*Primary Examiner* — Anthony D Brown
(74) *Attorney, Agent, or Firm* — Banner & Witcott, Ltd.

(57) ABSTRACT

Aspects of the disclosure relate to linking channel-specific systems with a user authentication hub. In some embodiments, a computing platform may receive, from a telephone agent support computer system associated with a telephone agent channel, an authentication request for a user account. The computing platform may generate a set of one or more authentication prompts based on a set of authentication rules defined for the telephone agent channel and may provide the set of one or more authentication prompts generated based on the set of authentication rules defined for the telephone agent channel. Subsequently, the computing platform may validate one or more responses to the set of one or more authentication prompts. Based on validating the one or more responses, the computing platform may provide user account information associated with the user account to the telephone agent support computer system associated with the telephone agent channel.

16 Claims, 30 Drawing Sheets

(58) Field of Classification Search
USPC .......................................................... 726/7
See application file for complete search history.

(56) References Cited

U.S. PATENT DOCUMENTS

| | | | |
|---|---|---|---|
| 2008/0098464 A1* | 4/2008 | Mizrah | G06F 21/36 |
| | | | 726/5 |
| 2013/0185207 A1* | 7/2013 | Lyons | G06Q 20/02 |
| | | | 705/44 |
| 2014/0282961 A1* | 9/2014 | Dorfman | H04L 63/0861 |
| | | | 726/7 |
| 2015/0161375 A1 | 6/2015 | Ghosh et al. | |
| 2016/0125386 A1 | 5/2016 | Desai et al. | |
| 2016/0125394 A1 | 5/2016 | Desai et al. | |
| 2016/0125405 A1 | 5/2016 | Alterman et al. | |
| 2016/0125412 A1 | 5/2016 | Cannon | |
| 2016/0125414 A1 | 5/2016 | Desai et al. | |
| 2016/0125458 A1 | 5/2016 | Enriquez et al. | |
| 2016/0125492 A1 | 5/2016 | Walker et al. | |
| 2016/0125519 A1 | 5/2016 | Sundaresan | |
| 2016/0127127 A1 | 5/2016 | Zhao et al. | |
| 2016/0127172 A1 | 5/2016 | Shaw | |
| 2016/0127539 A1 | 5/2016 | Sharma | |
| 2016/0127540 A1 | 5/2016 | Sharma et al. | |
| 2016/0127541 A1 | 5/2016 | Sharma | |
| 2016/0127548 A1 | 5/2016 | Sharma | |
| 2016/0127549 A1 | 5/2016 | Sharma | |
| 2016/0127562 A1 | 5/2016 | Chauhan | |
| 2016/0127566 A1 | 5/2016 | Sharma et al. | |
| 2016/0127567 A1 | 5/2016 | Kimmel | |
| 2016/0127569 A1 | 5/2016 | Kamas et al. | |
| 2016/0127683 A1 | 5/2016 | Hanson et al. | |
| 2016/0127684 A1 | 5/2016 | Hanson et al. | |
| 2016/0127808 A1 | 5/2016 | Wong et al. | |
| 2016/0127875 A1 | 5/2016 | Zampini, II | |
| 2016/0128015 A1 | 5/2016 | McCann et al. | |
| 2016/0128104 A1 | 5/2016 | Logue | |
| 2016/0132299 A1 | 5/2016 | Harrison | |
| 2016/0132309 A1 | 5/2016 | Rajasekhar et al. | |
| 2016/0132401 A1 | 5/2016 | O'Hare et al. | |
| 2016/0132516 A1 | 5/2016 | Greenberg et al. | |
| 2016/0132604 A1 | 5/2016 | Brust et al. | |
| 2016/0132676 A1 | 5/2016 | Avganim | |
| 2016/0132696 A1 | 5/2016 | Vidhani et al. | |
| 2016/0132735 A1 | 5/2016 | Derakhshani et al. | |
| 2016/0132816 A1 | 5/2016 | Lush | |
| 2016/0132863 A1 | 5/2016 | Dodin | |
| 2016/0132875 A1 | 5/2016 | Blanco et al. | |
| 2016/0132880 A1 | 5/2016 | O'Regan et al. | |
| 2016/0132883 A1 | 5/2016 | Evans | |
| 2016/0132890 A1 | 5/2016 | Banerjee et al. | |
| 2016/0132894 A1 | 5/2016 | Greenberg et al. | |
| 2016/0132918 A1 | 5/2016 | Thomas | |
| 2016/0132927 A1 | 5/2016 | Greenberg et al. | |
| 2016/0132970 A1 | 5/2016 | Greenberg et al. | |
| 2016/0133062 A1 | 5/2016 | Greenberg et al. | |
| 2016/0133108 A1 | 5/2016 | Bucsa et al. | |
| 2016/0134431 A1 | 5/2016 | Ebrom et al. | |
| 2016/0134599 A1 | 5/2016 | Ross et al. | |
| 2016/0134755 A1 | 5/2016 | Carlson et al. | |
| 2016/0134756 A1 | 5/2016 | Shaw | |
| 2016/0135232 A1 | 5/2016 | Schemagin et al. | |
| 2016/0352705 A1 | 12/2016 | Lockhart et al. | |
| 2016/0380976 A1* | 12/2016 | Dhandayuthapani | ....................... |
| | | | H04L 63/1466 |
| | | | 726/4 |

OTHER PUBLICATIONS

Feb. 26, 2019 U.S. Non-Final Office Action—U.S. Appl. No. 15/155,048.
Sep. 10, 2019 U.S. Final Office Action—U.S. Appl. No. 15/155,044.
Sep. 24, 2019 U.S. Final Office Action—U.S. Appl. No. 15/155,048.
Nov. 12, 2021—U.S. Final Office Action—U.S. Appl. No. 16/832,492.

* cited by examiner

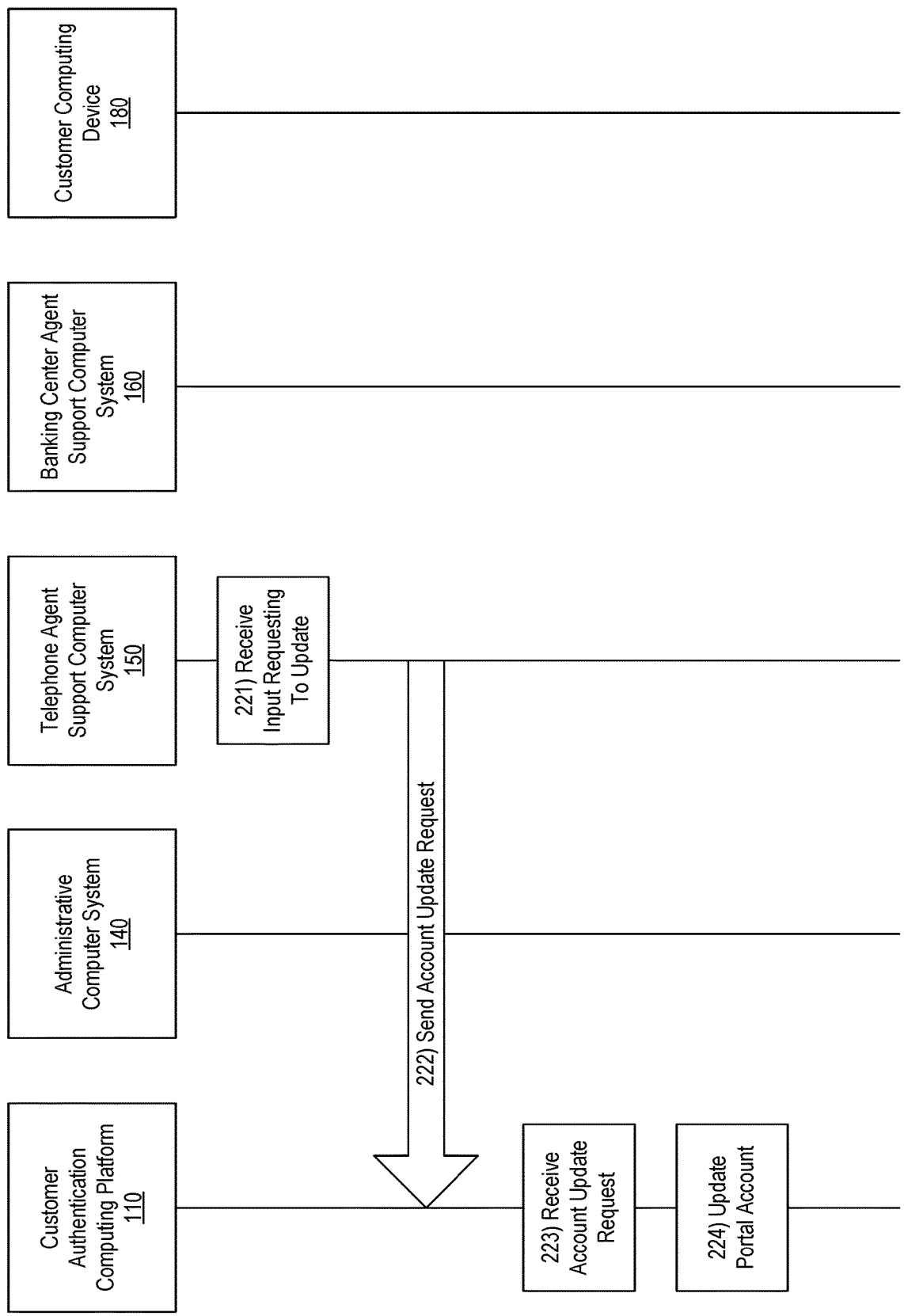

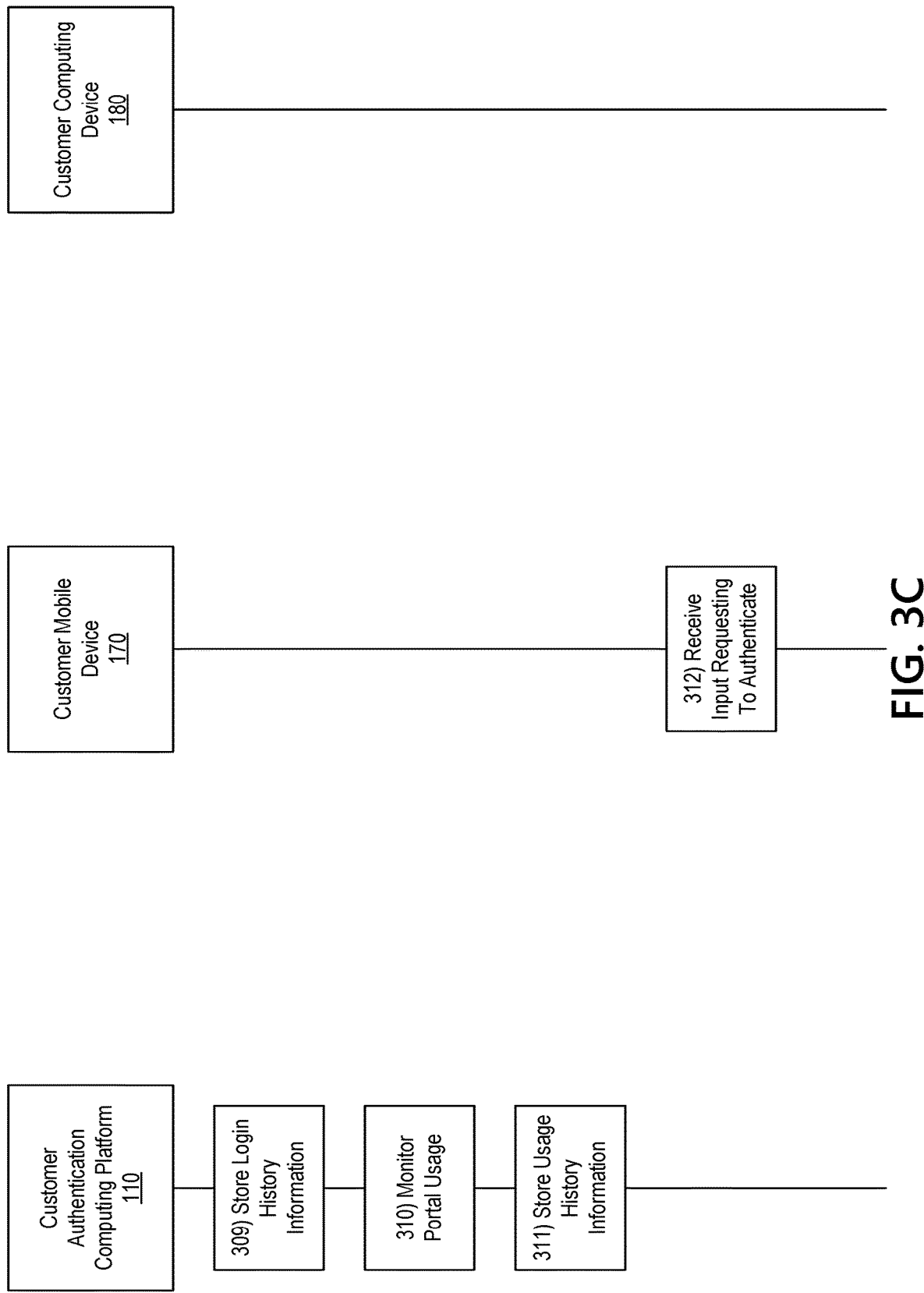

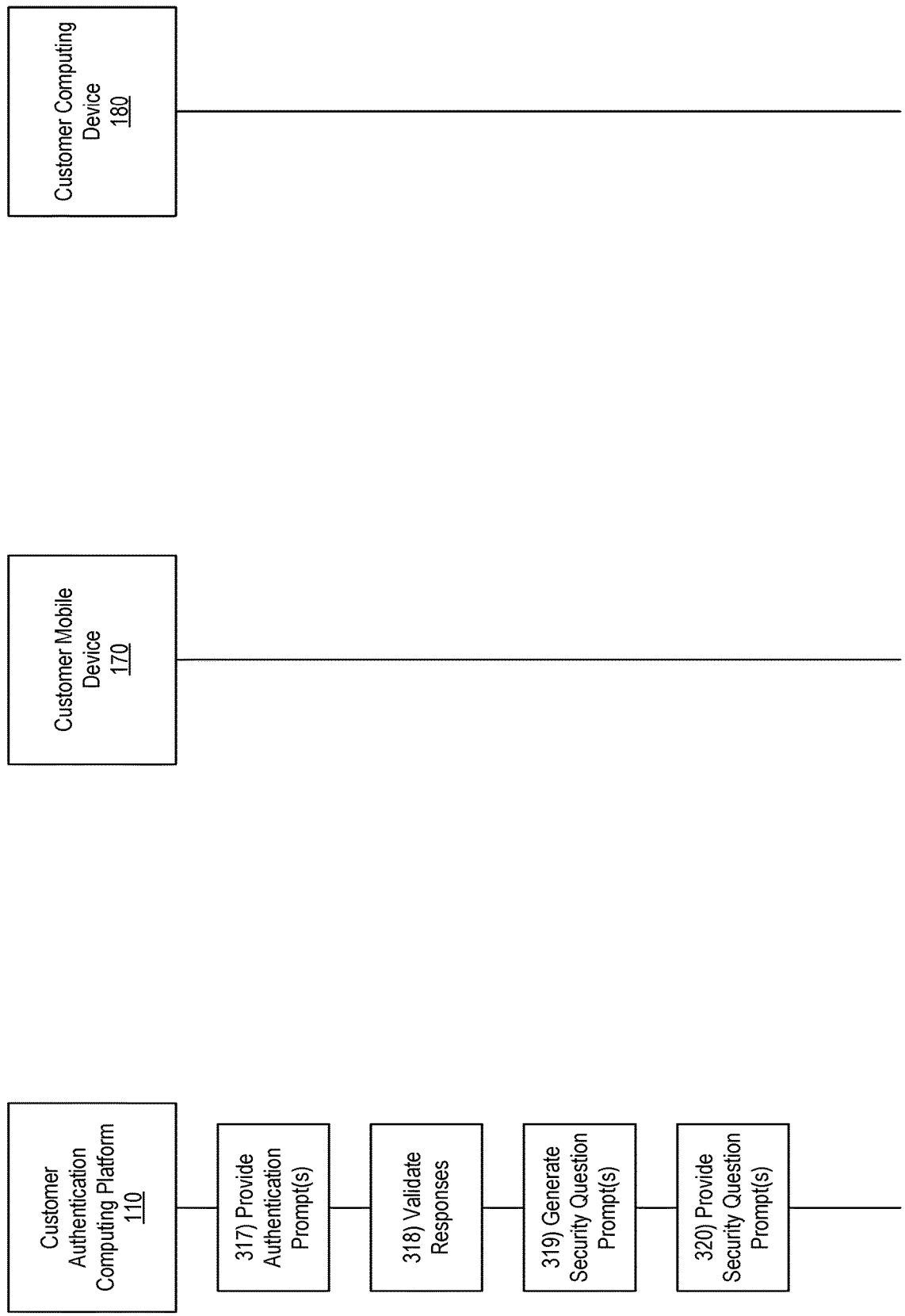

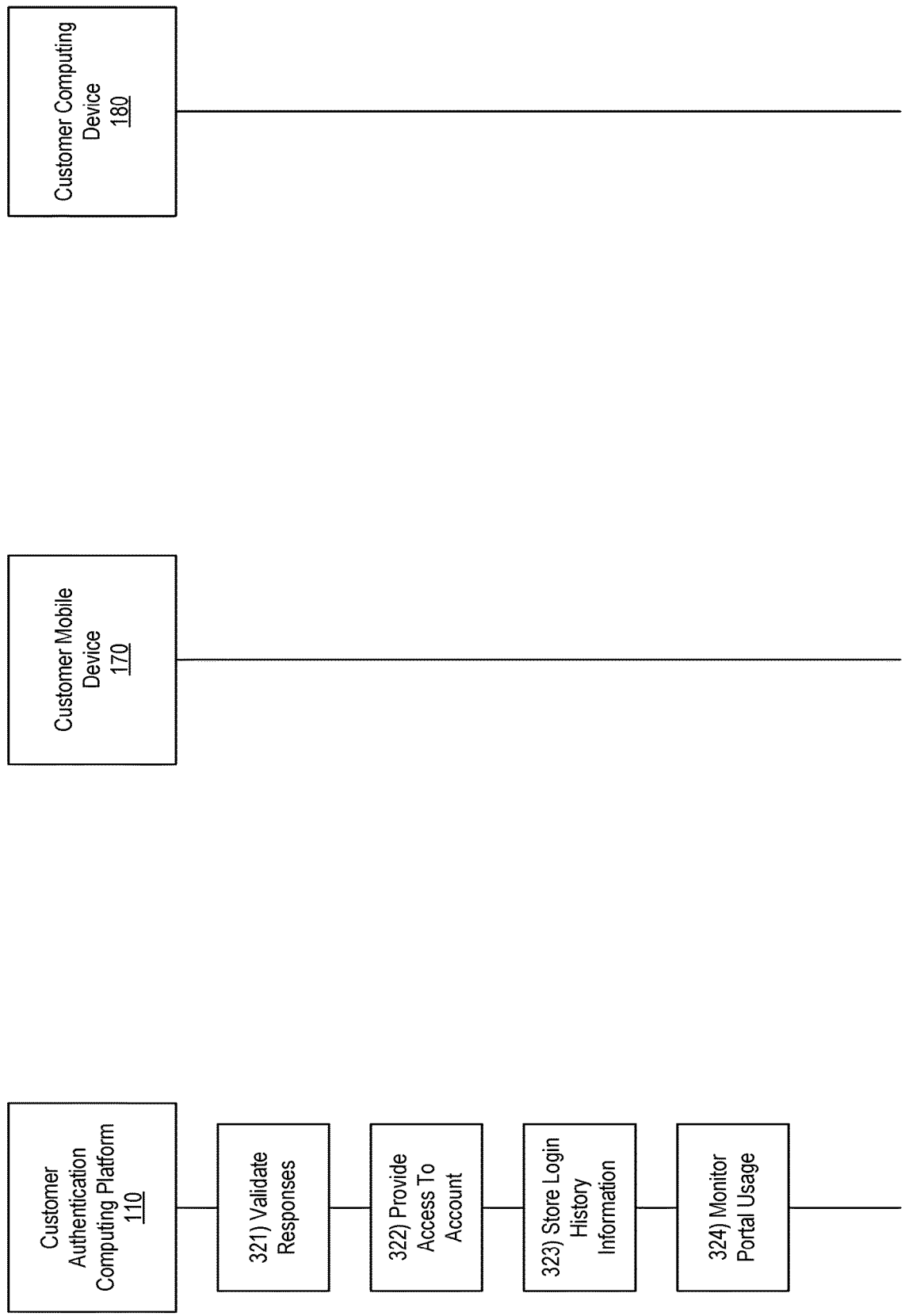

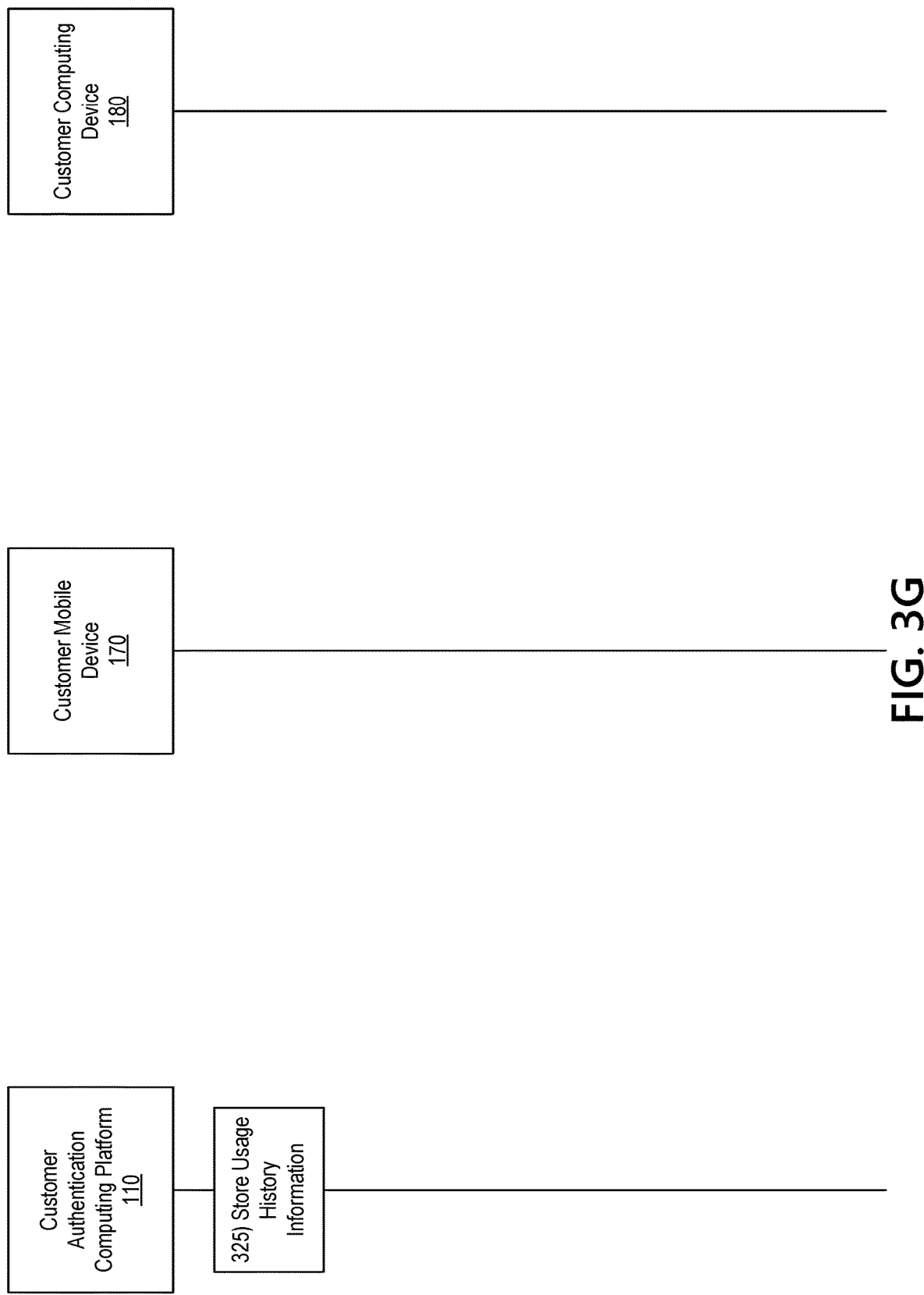

600

Banking Center Agent Support Application
*Authentication Hub Integration*

You have requested to authenticate the following customer, First Last, via an in-person banking channel.

Please ask the customer to provide their online banking username and select "Continue" to proceed to the next screen.

We will ask the customer to answer one or more security questions, provide a one-time passcode, and/or provide biometric input using their registered mobile device, if applicable.

| *Help* | *Continue* |

Mobile Banking Application
*Security Question – Login History*

Please answer the following security question(s) to access your online banking account.

On XX/XX/XXXX, you used which of the following devices to access your online banking account?
[ ] Desktop Computing Device A
[ ] Mobile Computing Device B
[ ] Smart Watch Device C

| *Help* | *Continue* |

FIG. 7

Mobile Banking Application
*Security Question – Login History*

Please answer the following security question(s) to access your online banking account.

On XX/XX/XXXX, you used which of the following channels to access your account?
[ ] Online Banking
[ ] Telephone Banking
[ ] In-Person Banking

| Help | Continue |

FIG. 8

Mobile Banking Application
*Security Question – Usage History*

Please answer the following security question(s) to access your online banking account.

On XX/XX/XXXX, you performed which of the following actions using the online banking portal?
[ ] Bill Pay to Company A
[ ] Transfer to Person B
[ ] Transfer to Savings Account C

| Help | Continue |

FIG. 9

LINKING CHANNEL-SPECIFIC SYSTEMS WITH A USER AUTHENTICATION HUB TO PROVIDE OMNI-CHANNEL USER AUTHENTICATION

CROSS-REFERENCE TO RELATED APPLICATIONS

This application claims the benefit of and is a continuation of U.S. patent application Ser. No. 15/155,044, filed May 15, 2016, and entitled "Linking Channel-Specific Systems with a User Authentication Hub to Provide Omni-Channel User Authentication." Each of the foregoing application(s) is incorporated by reference herein in its entirety.

BACKGROUND

Aspects of the disclosure relate to computer hardware and software. In particular, one or more aspects of the disclosure generally relate to computer hardware and software for linking channel-specific systems with a user authentication hub to provide omni-channel user authentication and dynamically authenticating end user clients using historical information.

Mobile computing devices are becoming increasingly popular, and many organizations are developing and providing their clients, employees, and others with mobile applications or "apps." These mobile applications may, for instance, allow clients, employees, and others to interact with the organization in various ways, depending on the functionality built into the particular application.

As organizations engage with clients using applications and other new technology, it may be increasingly important for such organizations to maintain and ensure the safety and security of client information. In some instances, however, the mobile devices on which such applications run can create information security issues and other issues for an organization and its computer systems, and it may be difficult to provide technical solutions that address and overcome the technical problems that create and underlie these information security issues and other issues.

SUMMARY

Aspects of the disclosure provide effective, efficient, scalable, and convenient technical solutions that address and overcome the technical problems associated with maintaining and ensuring the safety and security of customer information.

For example, some aspects of the disclosure provide ways of linking channel-specific systems with a user authentication hub to provide omni-channel user authentication. For instance, a channel-independent authentication widget may be incorporated into different client support computer systems that are used across different channels of an organization. Such an authentication widget may provide unified client authentication functionalities to and/or within dedicated channel-specific computer systems and applications, so as to provide centralized computing services and resources to support client authentication across the different channels of the organization. As illustrated in greater detail below, this approach may enhance convenience for clients and other end users of an organization (e.g., as such clients and users may be able to authenticate using familiar credentials, such as a username, passcode, and/or other credentials, across different channels of the organization) and for the organization itself (e.g., as an omni-channel approach to client authentication may reduce the need for and/or use of computing resources, processing resources, network bandwidth, development resources, and/or other resources). In addition, this approach also may ensure the safety and security of client information by enabling consistently strong processing of authentication requests, thereby benefiting both the clients and the organization which maintains and provides access to the client information.

Other aspects of the disclosure provide ways of dynamically authenticating end user clients using historical information collected by different organization computer systems when authenticating and/or providing access to such end user clients. For instance, a client authentication computing platform may dynamically generate authentication questions for a client or other end user based on the user's login history information, usage history information, and/or other historical information, before providing the client with access to user account information. This approach may strengthen and improve upon other authentication processes performed by the organization's computer systems and may thereby enhance and ensure the safety and security of client information maintained by the organization.

By implementing one or more aspects of the disclosure, an organization thus may be able to ensure the safety and security of its computer systems and of the client information that may be stored and/or maintained by such computer systems, as illustrated in greater detail below.

In accordance with one or more embodiments, a customer authentication computing platform having at least one processor, a memory, and a communication interface may receive, via the communication interface, and from a telephone agent support computer system associated with a telephone agent channel, an authentication request for a user account. Based on receiving the authentication request from the telephone agent support computer system associated with the telephone agent channel, the customer authentication computing platform may generate a set of one or more authentication prompts based on a set of authentication rules defined for the telephone agent channel. Subsequently, the customer authentication computing platform may provide the set of one or more authentication prompts generated based on the set of authentication rules defined for the telephone agent channel. Then, the customer authentication computing platform may validate one or more responses to the set of one or more authentication prompts generated based on the set of authentication rules defined for the telephone agent channel. Based on validating the one or more responses to the set of one or more authentication prompts generated based on the set of authentication rules defined for the telephone agent channel, the customer authentication computing platform may provide user account information associated with the user account to the telephone agent support computer system associated with the telephone agent channel.

In some embodiments, the authentication request may include information requesting to authenticate a caller as a customer of a financial institution using one or more credentials of an online banking account maintained by the financial institution for the customer.

In some embodiments, providing the set of one or more authentication prompts generated based on the set of authentication rules defined for the telephone agent channel may include sending, via the communication interface, and to the telephone agent support computer system associated with the telephone agent channel, a message prompting a user of the telephone agent support computer system associated with the telephone agent channel to prompt the caller to provide a username associated with the online banking account maintained by the financial institution for the customer.

In some embodiments, providing the set of one or more authentication prompts generated based on the set of authentication rules defined for the telephone agent channel may include sending, via the communication interface, and to the telephone agent support computer system associated with the telephone agent channel, a message prompting a user of the telephone agent support computer system associated with the telephone agent channel to prompt the caller to provide a response to a security question associated with the online banking account maintained by the financial institution for the customer.

In some embodiments, providing the set of one or more authentication prompts generated based on the set of authentication rules defined for the telephone agent channel may include sending, via the communication interface, and to a customer mobile device registered to the customer of the financial institution, a one-time passcode; and sending, via the communication interface, and to the telephone agent support computer system associated with the telephone agent channel, a message prompting a user of the telephone agent support computer system associated with the telephone agent channel to prompt the caller to provide the one-time passcode.

In some embodiments, providing the set of one or more authentication prompts generated based on the set of authentication rules defined for the telephone agent channel may include sending, via the communication interface, and to a customer mobile device registered to the customer of the financial institution, a biometric input prompt; and receiving, via the communication interface, and from the customer mobile device registered to the customer of the financial institution, biometric validation input.

In some embodiments, providing the set of one or more authentication prompts generated based on the set of authentication rules defined for the telephone agent channel may include sending at least one authentication prompt to an omni-channel user interface component integrated into an application executed by the telephone agent support computer system. In some instances, providing the user account information associated with the user account to the telephone agent support computer system associated with the telephone agent channel may include sending at least a portion of the user account information associated with the user account to the omni-channel user interface component integrated into the application executed by the telephone agent support computer system. In some instances, providing the user account information associated with the user account to the telephone agent support computer system associated with the telephone agent channel may include sending a message indicating that the caller has been authenticated to the omni-channel user interface component integrated into the application executed by the telephone agent support computer system.

In some embodiments, the customer authentication computing platform may receive, via the communication interface, and from the telephone agent support computer system associated with the telephone agent channel, an account update request. Subsequently, the customer authentication computing platform may update the online banking account maintained by the financial institution for the customer based on the account update request received from the telephone agent support computer system associated with the telephone agent channel.

In some embodiments, prior to receiving the authentication request from the telephone agent support computer system associated with the telephone agent channel, the customer authentication computing platform may receive, via the communication interface, and from an administrative computer system, authentication rules information defining the set of authentication rules for the telephone agent channel. Subsequently, the customer authentication computing platform may store the authentication rules information defining the set of authentication rules for the telephone agent channel received from the administrative computer system.

In some embodiments, the customer authentication computing platform may receive, via the communication interface, and from a banking center agent support computer system associated with a banking center channel, a second authentication request for a second user account. Based on receiving the second authentication request for the second user account from the banking center agent support computer system associated with the banking center channel, the customer authentication computing platform may generate a second set of one or more authentication prompts based on a second set of authentication rules defined for the banking center channel. Subsequently, the customer authentication computing platform may provide the second set of one or more authentication prompts generated based on the second set of authentication rules defined for the banking center channel. Then, the customer authentication computing platform may validate one or more responses to the second set of one or more authentication prompts generated based on the second set of authentication rules defined for the banking center channel. Based on validating the one or more responses to the second set of one or more authentication prompts generated based on the second set of authentication rules defined for the banking center channel, the customer authentication computing platform may provide second user account information associated with the second user account to the banking center agent support computer system associated with the banking center channel.

In some instances, the second authentication request may include information requesting to authenticate a visitor to a banking center as a second customer of the financial institution using one or more credentials of a second online banking account maintained by the financial institution for the second customer. In some instances, providing the second set of one or more authentication prompts generated based on the second set of authentication rules defined for the banking center channel may include sending at least one authentication prompt to an omni-channel user interface component integrated into an application executed by the banking center agent support computer system associated with the banking center channel. In some instances, providing the second user account information associated with the second user account to the banking center agent support computer system associated with the banking center channel may include sending at least a portion of the second user account information associated with the second user account to the omni-channel user interface component integrated into the application executed by the banking center agent support computer system associated with the banking center channel. In some instances, providing the second user account information associated with the second user account to the banking center agent support computer system associated with the banking center channel may include sending a message indicating that the visitor to the banking center has been authenticated to the omni-channel user interface component integrated into the application executed by the banking center agent support computer system associated with the banking center channel.

In some embodiments, the customer authentication computing platform may receive, via the communication interface, and from a customer portal computer system associated with an online banking channel, a third authentication request for a third user account. Based on receiving the third authentication request for the third user account from the customer portal computer system associated with the online banking channel, the customer authentication computing platform may generate a third set of one or more authentication prompts based on a third set of authentication rules defined for the online banking channel. Subsequently, the customer authentication computing platform may provide the third set of one or more authentication prompts generated based on the third set of authentication rules defined for the online banking channel. Then, the customer authentication computing platform may validate one or more responses to the third set of one or more authentication prompts generated based on the third set of authentication rules defined for the online banking channel. Based on validating the one or more responses to the third set of one or more authentication prompts generated based on the third set of authentication rules defined for the online banking channel, the customer authentication computing platform may provide third user account information associated with the third user account to the customer portal computer system associated with the online banking channel.

In some instances, the third authentication request may include information requesting to authenticate a user of an online banking portal as a third customer of the financial institution using one or more credentials of a third online banking account maintained by the financial institution for the third customer.

In accordance with one or more additional embodiments, a customer authentication computing platform having at least one processor, a memory, and a communication interface may receive, via the communication interface, and from a customer mobile device, an authentication request for a user account. Based on receiving the authentication request for the user account from the customer mobile device, the customer authentication computing platform may generate one or more authentication prompts based on one or more authentication rules. Subsequently, the customer authentication computing platform may provide the one or more authentication prompts generated based on the one or more authentication rules. Then, the customer authentication computing platform may validate one or more responses to the one or more authentication prompts generated based on the one or more authentication rules. Based on validating the one or more responses to the one or more authentication prompts generated based on the one or more authentication rules, the customer authentication computing platform may generate one or more security questions based on historical information associated with the user account. Subsequently, the customer authentication computing platform may provide the one or more security questions generated based on the historical information associated with the user account. Then, the customer authentication computing platform may validate one or more responses to the one or more security questions generated based on the historical information associated with the user account. Based on validating the one or more responses to the one or more security questions generated based on the historical information associated with the user account, the customer authentication computing platform may provide user account information associated with the user account to the customer mobile device.

In some embodiments, the authentication request for the user account may include information requesting to authenticate a user of the customer mobile device as a customer of a financial institution using one or more credentials of an online banking account maintained by the financial institution for the customer and accessible via an online banking portal provided by the financial institution.

In some embodiments, the historical information associated with the user account may include login history information associated with the user account. In some instances, the login history information associated with the user account may include device information identifying at least one device that was previously used to access the user account. In some instances, the login history information associated with the user account may include channel information identifying at least one channel that was previously used to access the user account.

In some embodiments, the historical information associated with the user account may include usage history information associated with the user account. In some instances, the usage history information associated with the user account may include action information identifying one or more actions that were previously performed during a usage session of the user account.

In some embodiments, providing the one or more authentication prompts generated based on the one or more authentication rules may include sending, via the communication interface, and to the customer mobile device, a prompt to provide a username and password for the user account.

In some embodiments, providing the one or more authentication prompts generated based on the one or more authentication rules may include sending, via the communication interface, and to a mobile computing device registered with the user account, a one-time passcode.

In some embodiments, providing the one or more authentication prompts generated based on the one or more authentication rules may include sending, via the communication interface, and to a mobile computing device registered with the user account, a biometric input prompt.

In some embodiments, providing the one or more security questions generated based on the historical information associated with the user account may include sending, via the communication interface, and to the customer mobile device, a prompt to respond to the one or more security questions generated based on the historical information associated with the user account.

In some embodiments, providing the user account information associated with the user account to the customer mobile device may include enabling the customer mobile device to access to the online banking portal provided by the financial institution.

In some embodiments, the customer authentication computing platform may store updated login history information for the user account based on providing the user account information associated with the user account to the customer mobile device.

In some embodiments, the customer authentication computing platform may store updated usage history information for the user account based on providing the user account information associated with the user account to the customer mobile device.

In some embodiments, prior to receiving the authentication request for the user account, the customer authentication computing platform may store login history information for the user account based on authenticating a user to the user account. Subsequently, the customer authentication computing platform may store usage history information for the user account based on monitoring usage of the user account during a usage session.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for linking channel-specific systems with a user authentication hub to provide omni-channel user authentication in accordance with one or more example embodiments;

FIGS. 3A-3G depict an illustrative event sequence for dynamically authenticating end user clients using historical information in accordance with one or more example embodiments;

FIGS. 4-9 depict example graphical user interfaces for linking channel-specific systems with a user authentication hub to provide omni-channel user authentication and dynamically authenticating end user clients using historical information in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
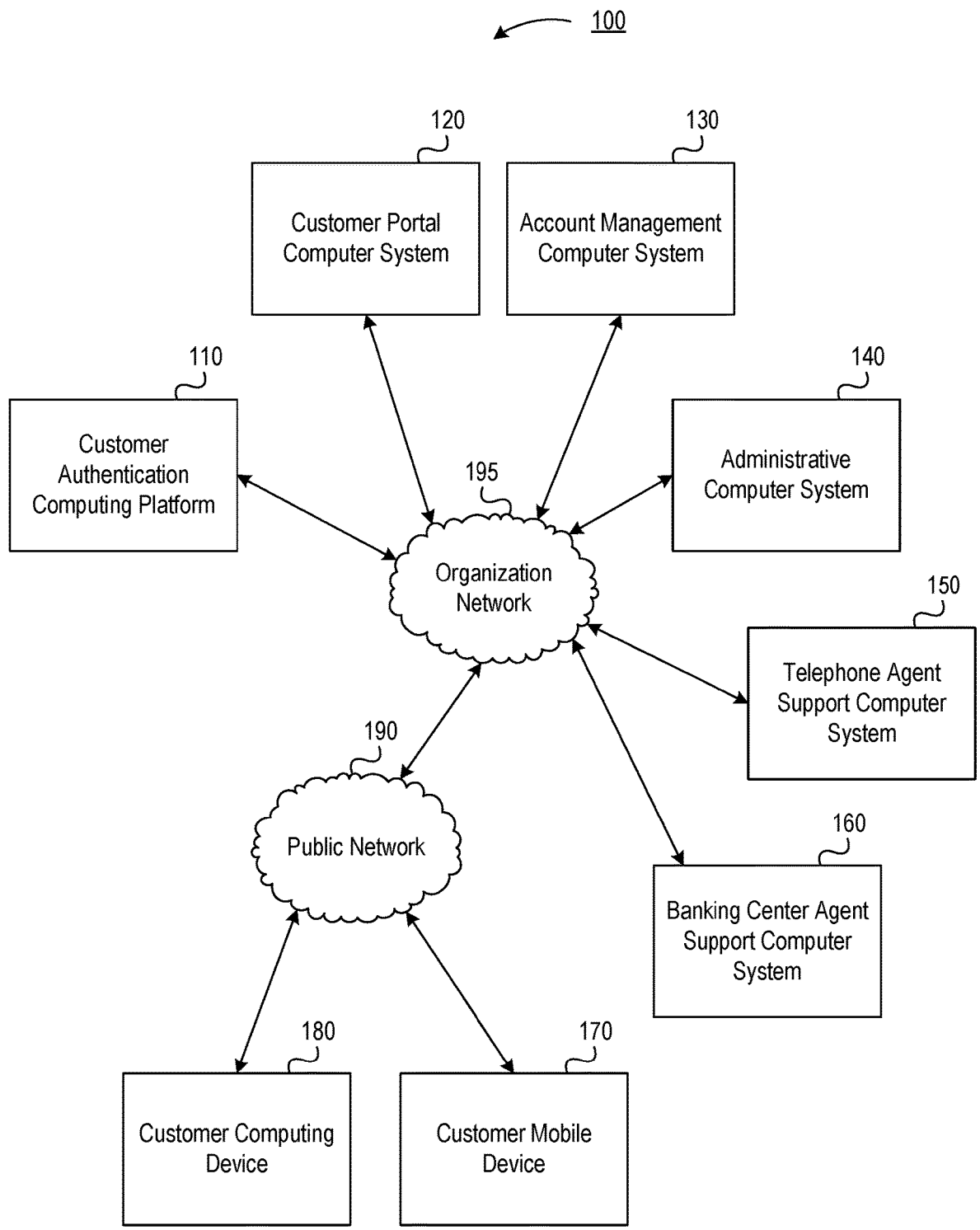
FIGS. 1A-1I depict an illustrative computing environment for linking channel-specific systems with a user authentication hub to provide omni-channel user authentication and dynamically authenticating end user clients using historical information in accordance with one or more example embodiments.

FIGS. 1A-1I depict an illustrative computing environment for linking channel-specific systems with a user authentication hub to provide omni-channel user authentication and dynamically authenticating end user clients using historical information in accordance with one or more example embodiments. Referring to FIG. 1A, computing environment 100 may include one or more computing devices. For example, computing environment 100 may include a customer portal computer system 120, an account management computer system 130, an administrative computer system 140, a telephone agent support computer system 150, a banking center agent support computer system 160, a customer mobile device 170, and a customer computing device 180.

Customer portal computer system 120 may be configured to provide a customer portal or other customer web site to one or more computing devices used by one or more customers of an organization. For instance, customer portal computer system 120 may be configured to provide an online banking portal or other online banking website to one or more computing devices used by one or more customers of a financial institution. Account management computer system 130 may be configured to store and/or maintain account information for one or more customers of an organization. For instance, account management computer system 130 may be configured to store and/or maintain account information for one or more customers of a financial institution. Administrative computer system 140 may be configured to provide one or more interfaces that allow for configuration and management of one or more other computing devices and/or computer systems included in computing environment 100.

Telephone agent support computer system 150 may be configured to be used by one or more telephone agents and/or customer service representatives of an organization. For instance, telephone agent support computer system 150 may be configured to store, access, and/or present various types of information, including customer information, to one or more telephone agents and/or customer service representatives of a financial institution (e.g., while they are assisting one or more customers of the financial institution over the phone). Banking center agent support computer system 160 may be configured to be used by one or more in-person agents and/or retail associates of an organization. For instance, banking center agent support computer system 160 may be configured to be used by one or more banking center agents, bank tellers, and/or other retail associates of a financial institution (e.g., while they are assisting one or more customers of the financial institution in person, at a banking center, or the like).

Customer mobile device 170 may be a mobile computing device (e.g., a smart phone, a tablet computer, a smart watch, a wearable device, or other mobile device) that is configured to be used by a customer of an organization, such as a customer of a financial institution. Customer computing device 180 may be a traditional computing device (e.g., a desktop computer, a laptop computer, or the like) that is configured to be used by a customer of an organization, such as a customer of a financial institution.

In one or more arrangements, customer portal computer system 120, account management computer system 130, administrative computer system 140, telephone agent support computer system 150, banking center agent support computer system 160, customer mobile device 170, and customer computing device 180 may be any type of computing device capable of receiving a user interface, receiving input via the user interface, and communicating the received input to one or more other computing devices. For example, customer portal computer system 120, account management computer system 130, administrative computer system 140, telephone agent support computer system 150, banking center agent support computer system 160, customer mobile device 170, and customer computing device 180 may, in some instances, be and/or include server computers, desktop computers, laptop computers, tablet computers, smart phones, or the like. As noted above, and as illustrated in greater detail below, any and/or all of customer portal computer system 120, account management computer system 130, administrative computer system 140, telephone agent support computer system 150, banking center agent support computer system 160, customer mobile device 170, and customer computing device 180 may, in some instances, be special-purpose computing devices configured to perform specific functions.

Computing environment 100 also may include one or more computing platforms. For example, computing environment 100 may include customer authentication computing platform 110. As illustrated in greater detail below, customer authentication computing platform 110 may include one or more computing devices configured to perform one or more of the functions described herein. For example, customer authentication computing platform 110 may include one or more computers (e.g., laptop computers, desktop computers, servers, server blades, or the like).

Computing environment 100 also may include one or more networks, which may interconnect one or more of customer authentication computing platform 110, customer portal computer system 120, account management computer system 130, administrative computer system 140, telephone agent support computer system 150, banking center agent support computer system 160, customer mobile device 170, and customer computing device 180. For example, computing environment 100 may include organization network 195 and public network 190. Organization network 195 and/or public network 190 may include one or more sub-networks (e.g., local area networks (LANs), wide area networks (WANs), or the like). Organization network 195 may be associated with a particular organization (e.g., a corporation, financial institution, educational institution, governmental institution, or the like) and may interconnect one or more computing devices associated with the organization. For example, customer authentication computing platform 110, customer portal computer system 120, account management computer system 130, administrative computer system 140, telephone agent support computer system 150, and banking center agent support computer system 160 may be associated with an organization (e.g., a financial institution), and organization network 195 may be associated with and/or operated by the organization, and may include one or more networks (e.g., LANs, WANs, virtual private networks (VPNs), or the like) that interconnect customer authentication computing platform 110, customer portal computer system 120, account management computer system 130, administrative computer system 140, telephone agent support computer system 150, and banking center agent support computer system 160 and one or more other computing devices and/or computer systems that are used by, operated by, and/or otherwise associated with the organization. Public network 190 may connect organization network 195 and/or one or more computing devices connected thereto (e.g., customer authentication computing platform 110, customer portal computer system 120, account management computer system 130, administrative computer system 140, telephone agent support computer system 150, and banking center agent support computer system 160) with one or more networks and/or computing devices that are not associated with the organization. For example, customer mobile device 170 and customer computing device 180 might not be associated with an organization that operates organization network 195 (e.g., because customer mobile device 170 and customer computing device 180 may be owned and/or operated by one or more entities different from the organization that operates organization network 195, such as one or more customers of the organization, rather than being owned and/or operated by the organization itself or an employee or affiliate of the organization), and public network 190 may include one or more networks (e.g., the internet) that connect customer mobile device 170 and customer computing device 180 to organization network 195 and/or one or more computing devices connected thereto (e.g., customer authentication computing platform 110, customer portal computer system 120, account management computer system 130, administrative computer system 140, telephone agent support computer system 150, and banking center agent support computer system 160).

Figure 1B:
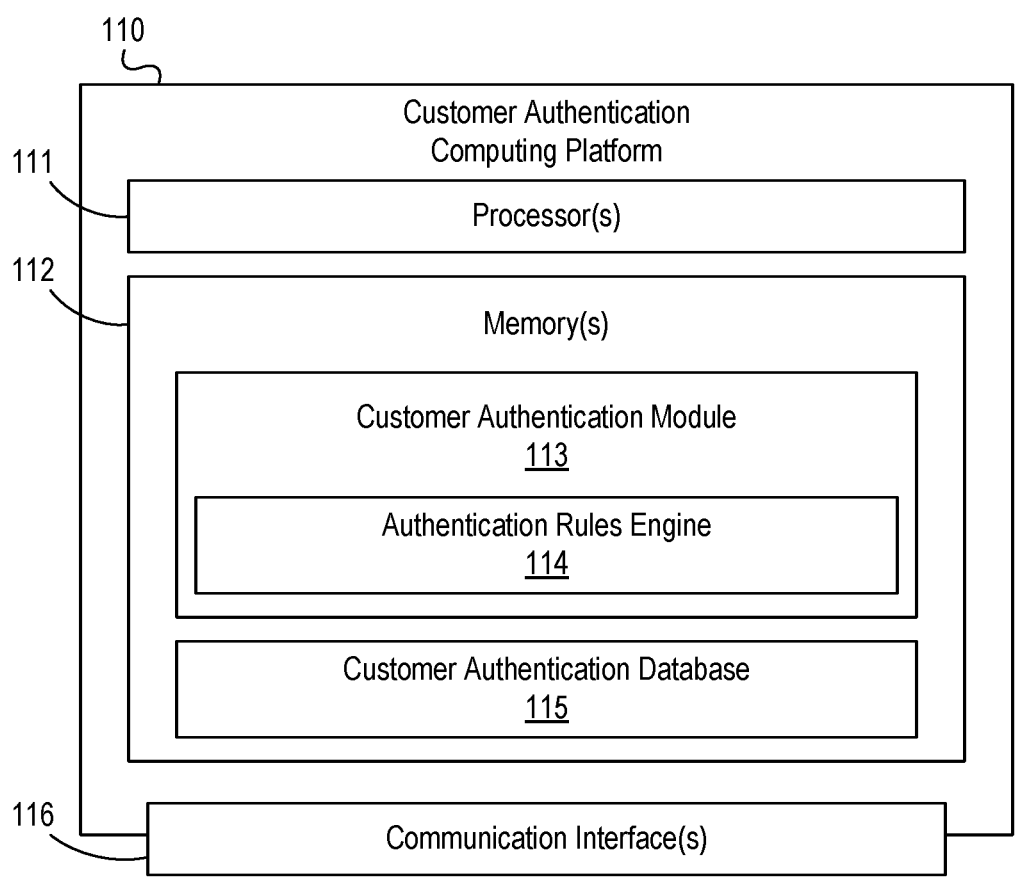

Referring to FIG. 1B, customer authentication computing platform 110 may include one or more processors 111, memory 112, and communication interface 116. A data bus may interconnect processor(s) 111, memory 112, and communication interface 116. Communication interface 116 may be a network interface configured to support communication between customer authentication computing platform 110 and one or more networks (e.g., organization network 195, public network 190, or the like). Memory 112 may include one or more program modules having instructions that when executed by processor(s) 111 cause customer authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of customer authentication computing platform 110 and/or by different computing devices that may form and/or otherwise make up customer authentication computing platform 110. For example, memory 112 may include a customer authentication module 113 and a customer authentication database 115. Customer authentication module 113 may provide and/or perform one or more functions that may enable authentication of one or more customers of an organization, such as a financial institution, including one or more functions to provide omni-channel authentication and/or dynamically authenticate end user clients using historical information, as illustrated in greater detail below. In addition, customer authentication module 113 may include an authentication rules engine 114, which may evaluate, process, and/or apply one or more rules in providing omni-channel authentication and/or in dynamically authenticating end user clients using historical information. Customer authentication database 115 may store authentication information and/or other information that may be created and/or used by customer authentication computing platform 110 in performing one or more functions.

Figure 1C:
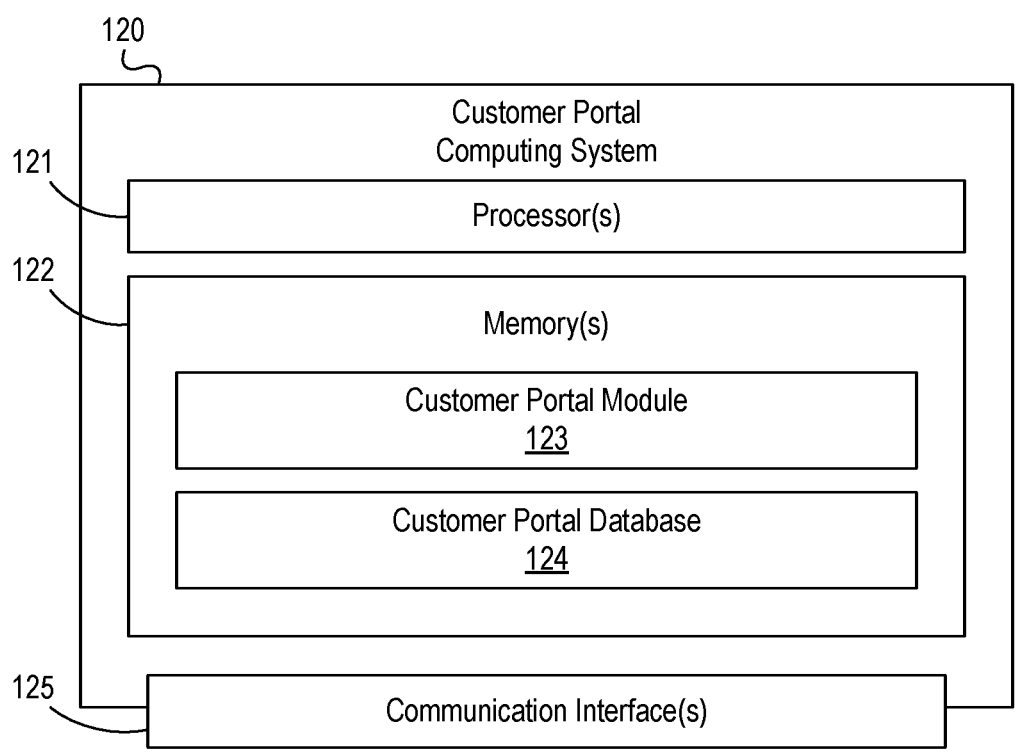

Referring to FIG. 1C, customer portal computer system 120 may include one or more processors 121, memory 122, and communication interface 125. A data bus may interconnect processor(s) 121, memory 122, and communication interface 125. Communication interface 125 may be a network interface configured to support communication between customer portal computer system 120 and one or more networks (e.g., organization network 195, public network 190, or the like). Memory 122 may include one or more program modules having instructions that when executed by processor(s) 121 cause customer portal computer system 120 to perform one or more functions described herein and/or one or more databases that may store and/or otherwise maintain information which may be used by such program modules and/or processor(s) 121. In some instances, the one or more program modules and/or databases may be stored by and/or maintained in different memory units of customer portal computer system 120 and/or by different computing devices that may form and/or otherwise make up customer portal computer system 120. For example, memory 122 may include a customer portal module 123 and a customer portal database 124. Customer portal module 123 may provide and/or perform one or more functions that may enable a customer portal, such as an online banking portal or website, to be provided to one or more customers of an organization and/or one or more computing devices used by such customers. Customer portal database 124 may store portal information and/or other information that may be created and/or used by customer portal computer system 120 in performing one or more functions.

Figure 1D:
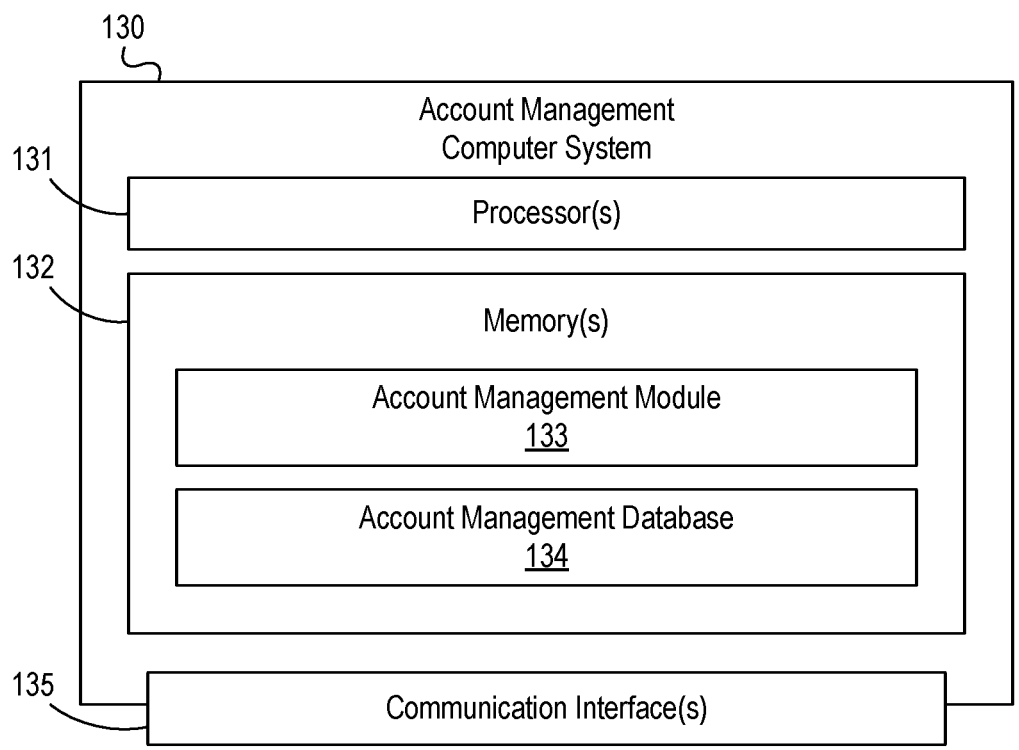

Referring to FIG. 1D, account management computer system 130 may include one or more processors 131, memory 132, and communication interface 135. A data bus may interconnect processor(s) 131, memory 132, and communication interface 135. Communication interface 135 may be a network interface configured to support communication between account management computer system 130 and one or more networks (e.g., organization network 195, public network 190, or the like). Memory 132 may include one or more program modules having instructions that when executed by processor(s) 131 cause account management computer system 130 to perform one or more functions described herein and/or one or more databases that may store and/or otherwise maintain information which may be used by such program modules and/or processor(s) 131. In some instances, the one or more program modules and/or databases may be stored by and/or maintained in different memory units of account management computer system 130 and/or by different computing devices that may form and/or otherwise make up account management computer system 130. For example, memory 132 may include an account management module 133 and an account management database 134. Account management module 133 may provide and/or perform one or more functions that may enable a customer of an organization to manage one or more aspects of an account. For instance, account management module 133 may provide and/or perform one or more functions that may enable a customer of a financial institution to manage one or more aspects of a financial account maintained by the financial institution for the customer (e.g., by allowing the customer to view account balance(s), request and/or execute bill pay transactions, transfer transactions, or the like). Account management database 134 may store account information and/or other information that may be created and/or used by account management computer system 130 in performing one or more functions.

Figure 1E:
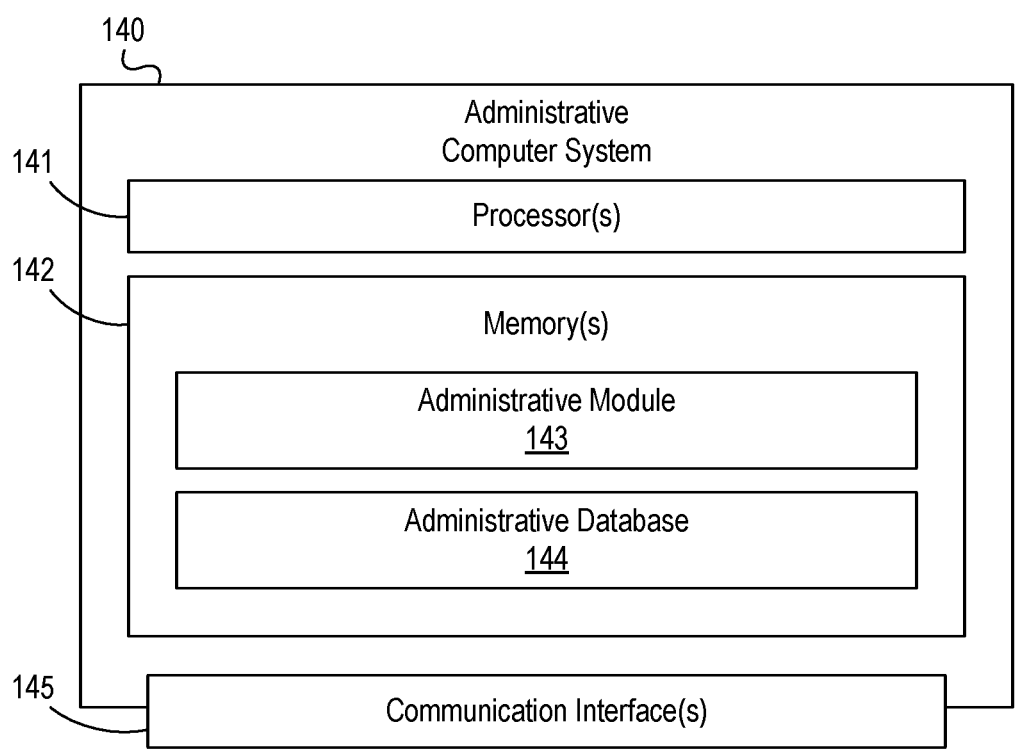

Referring to FIG. 1E, administrative computer system 140 may include one or more processors 141, memory 142, and communication interface 145. A data bus may interconnect processor(s) 141, memory 142, and communication interface 145. Communication interface 145 may be a network interface configured to support communication between administrative computer system 140 and one or more networks (e.g., organization network 195, public network 190, or the like). Memory 142 may include one or more program modules having instructions that when executed by processor(s) 141 cause administrative computer system 140 to perform one or more functions described herein and/or one or more databases that may store and/or otherwise maintain information which may be used by such program modules and/or processor(s) 141. In some instances, the one or more program modules and/or databases may be stored by and/or maintained in different memory units of administrative computer system 140 and/or by different computing devices that may form and/or otherwise make up administrative computer system 140. For example, memory 142 may include an administrative module 143 and an administrative database 144. Administrative module 143 may provide and/or perform one or more functions that may enable an administrative user to configure one or more computing devices included in computing environment 100. Administrative database 144 may store administrative information and/or other information that may be created and/or used by administrative computer system 140 in performing one or more functions.

Figure 1F:
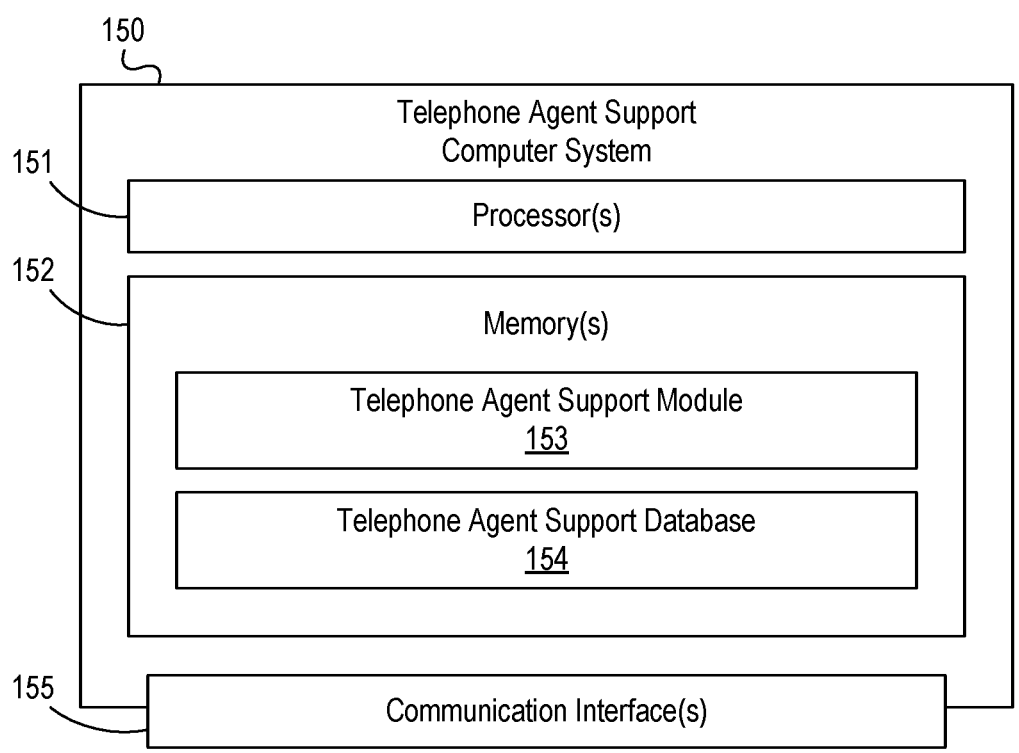

Referring to FIG. 1F, telephone agent support computer system 150 may include one or more processors 151, memory 152, and communication interface 155. A data bus may interconnect processor(s) 151, memory 152, and communication interface 155. Communication interface 155 may be a network interface configured to support communication between telephone agent support computer system 150 and one or more networks (e.g., organization network 195, public network 190, or the like). Memory 152 may include one or more program modules having instructions that when executed by processor(s) 151 cause telephone agent support computer system 150 to perform one or more functions described herein and/or one or more databases that may store and/or otherwise maintain information which may be used by such program modules and/or processor(s) 151. In some instances, the one or more program modules and/or databases may be stored by and/or maintained in different memory units of telephone agent support computer system 150 and/or by different computing devices that may form and/or otherwise make up telephone agent support computer system 150. For example, memory 152 may include a telephone agent support module 153 and a telephone agent support database 154. Telephone agent support module 153 may provide and/or perform one or more functions that may enable a telephone agent or customer service representative of an organization, such as a financial institution, to assist a caller (who may, e.g., be calling for assistance with one or more accounts, transactions, or the like). Telephone agent support database 154 may store telephone agent support information and/or other information that may be created and/or used by telephone agent support computer system 150 in performing one or more functions.

Figure 1G:
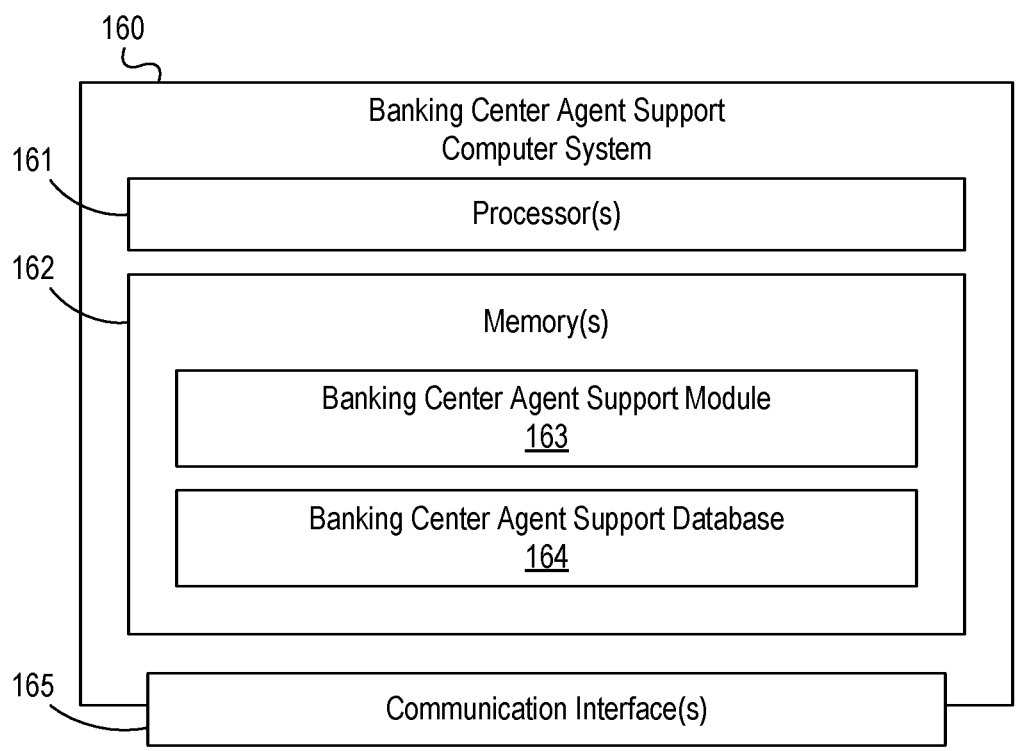

Referring to FIG. 1G, banking center agent support computer system 160 may include one or more processors 161, memory 162, and communication interface 165. A data bus may interconnect processor(s) 161, memory 162, and communication interface 165. Communication interface 165 may be a network interface configured to support communication between banking center agent support computer system 160 and one or more networks (e.g., organization network 195, public network 190, or the like). Memory 162 may include one or more program modules having instructions that when executed by processor(s) 161 cause banking center agent support computer system 160 to perform one or more functions described herein and/or one or more databases that may store and/or otherwise maintain information which may be used by such program modules and/or processor(s) 161. In some instances, the one or more program modules and/or databases may be stored by and/or maintained in different memory units of banking center agent support computer system 160 and/or by different computing devices that may form and/or otherwise make up banking center agent support computer system 160. For example, memory 162 may include a banking center agent support module 163 and a banking center agent support database 164. Banking center agent support module 163 may provide and/or perform one or more functions that may enable a banking center agent or retail associate of an organization, such as a financial institution, to assist a customer (who may, e.g., be physically visiting a banking center in-person to obtain assistance with one or more accounts, transactions, or the like). Banking center agent support database 164 may store banking center agent support information and/or other information that may be created and/or used by banking center agent support computer system 160 in performing one or more functions.

Figure 1H:
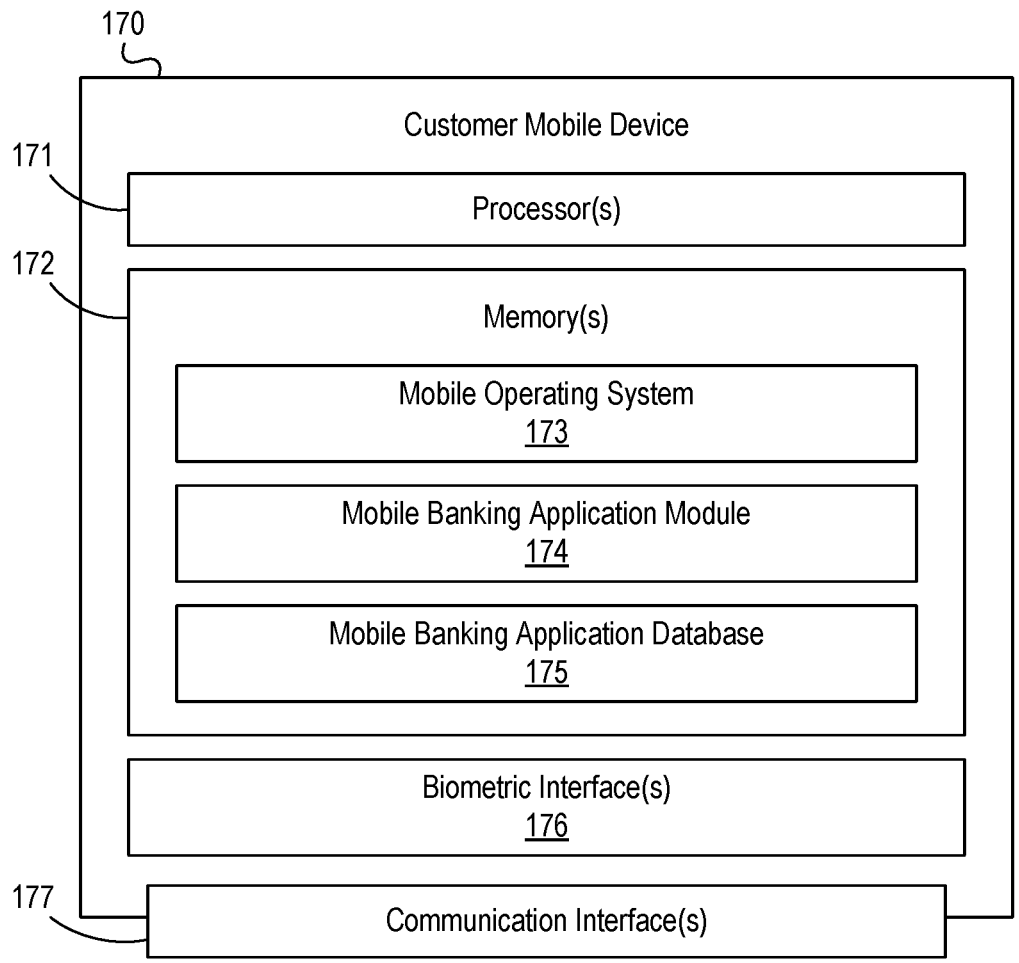

Referring to FIG. 1H, customer mobile device 170 may include one or more processors 171, memory 172, one or more biometric interfaces 176, and communication interface 177. A data bus may interconnect processor(s) 171, memory 172, biometric interface(s) 176, and communication interface 177. Communication interface 177 may be a network interface configured to support communication between customer mobile device 170 and one or more networks (e.g., organization network 195, public network 190, or the like). Biometric interface(s) 176 may include one or more input/output interfaces that may enable customer mobile device 170 to receive biometric input from a user of customer mobile device 170. For example, biometric interface(s) 176 may include one or more fingerprint readers, one or more microphones, one or more cameras, one or more retinal scanners, and/or one or more other input/output devices. Memory 172 may include one or more program modules having instructions that when executed by processor(s) 171 cause customer mobile device 170 to perform one or more functions described herein and/or one or more databases that may store and/or otherwise maintain information which may be used by such program modules and/or processor(s) 171. For example, memory 172 may include a mobile operating system 173, a mobile banking application module 174, and a mobile banking application database 175. Mobile operating system 173 may include software that provides and supports various functions of customer mobile device 170, such as providing a container in which a mobile banking application may execute, for instance. Mobile banking application module 174 may provide and/or perform one or more functions associated with a mobile banking application (which may, e.g., be used by a user of customer mobile device 170 to view and/or interact with financial account information). Mobile banking application database 175 may store mobile banking information and/or other information that may be created and/or used by customer mobile device 170 in performing one or more functions.

Figure 1I:
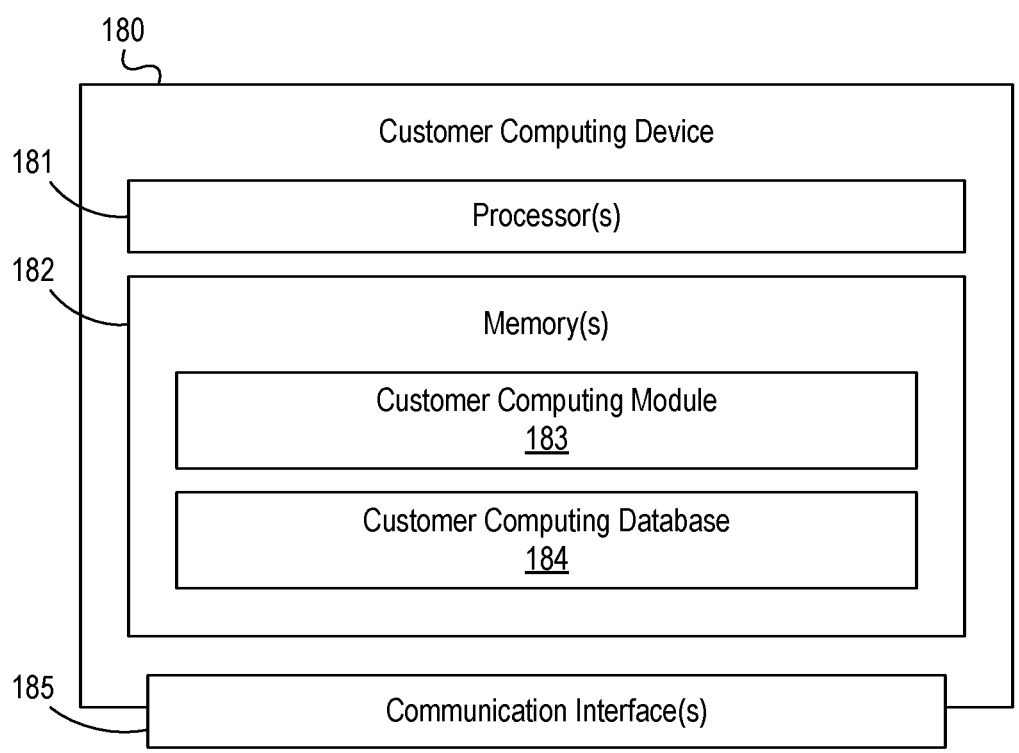

Referring to FIG. 1I, customer computing device 180 may include one or more processors 181, memory 182, and communication interface 185. A data bus may interconnect processor(s) 181, memory 182, and communication interface 185. Communication interface 185 may be a network interface configured to support communication between customer computing device 180 and one or more networks (e.g., organization network 195, public network 190, or the like). Memory 182 may include one or more program modules having instructions that when executed by processor(s) 181 cause customer computing device 180 to perform one or more functions described herein and/or one or more databases that may store and/or otherwise maintain information which may be used by such program modules and/or processor(s) 181. In some instances, the one or more program modules and/or databases may be stored by and/or maintained in different memory units of customer computing device 180 and/or by different computing devices that may form and/or otherwise make up customer computing device 180. For example, memory 182 may include a customer computing module 183 and a customer computing database 184. Customer computing module 183 may provide and/or perform one or more functions that may enable a customer of an organization, such as a financial institution, to access one or more user interfaces, such as a web portal, that may be provided by the organization. Customer computing database 184 may store customer computing information and/or other information that may be created and/or used by customer computing device 180 in performing one or more functions.

Figure 2A:
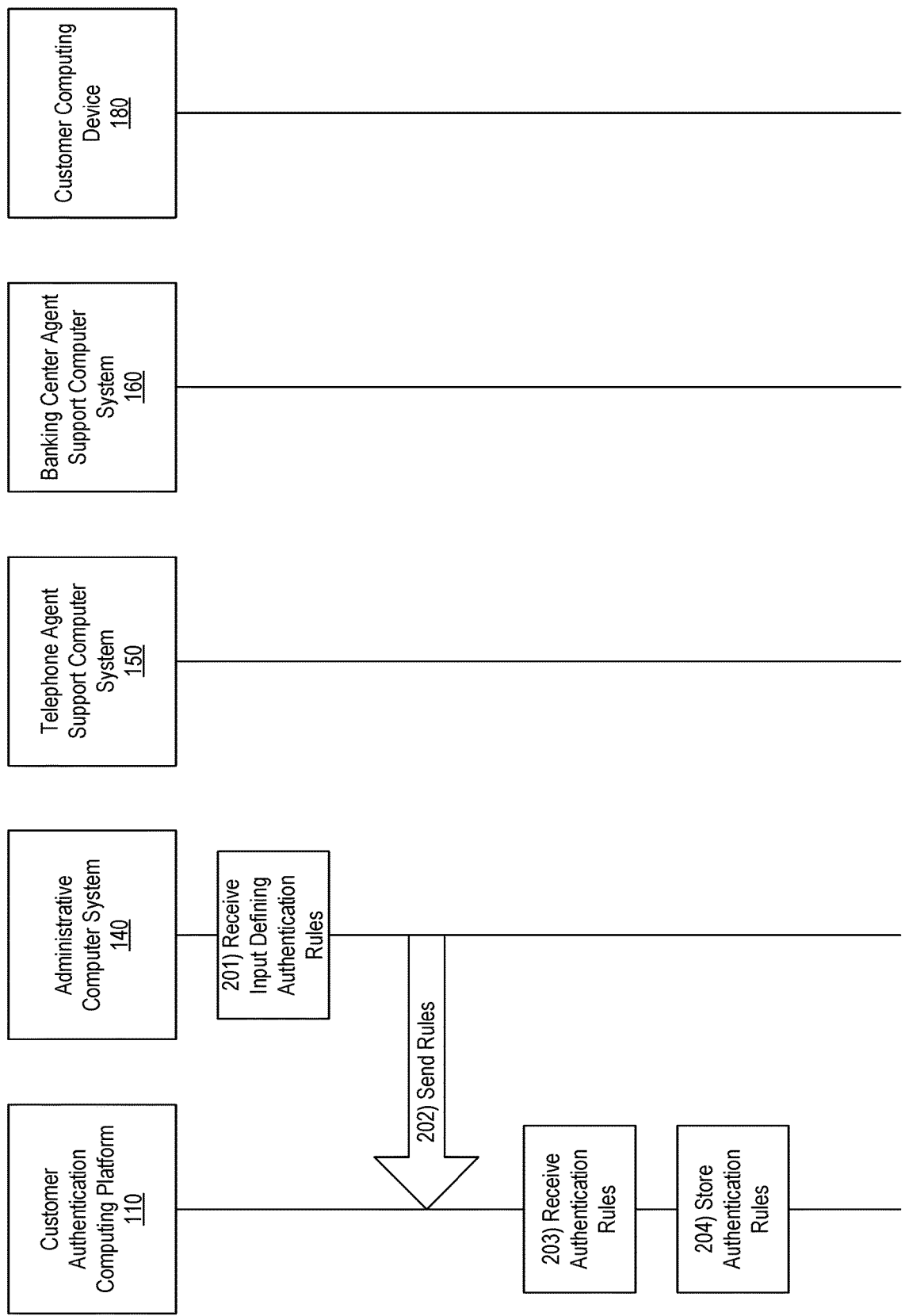

FIGS. 2A-2I depict an illustrative event sequence for linking channel-specific systems with a user authentication hub to provide omni-channel user authentication in accordance with one or more example embodiments. Referring to FIG. 2A, at step 201, administrative computer system 140 may receive input defining one or more authentication rules. For example, at step 201, administrative computer system 140 may receive input from a user of administrative computer system 140 defining one or more authentication rules for one or more channels via which a customer of an organization, such as a financial institution, may interact with the organization. For instance, administrative computer system 140 may receive input defining one or more authentication rules for an in-person banking channel (which may, e.g., be associated with one or more banking centers and/or other physical retail locations operated by a financial institution), a telephone banking channel (which may, e.g., be associated with one or more telephone lines serviced by one or more customer service representatives and/or call centers of a financial institution), an online banking channel (which may, e.g., be associated with one or more online banking portals and/or mobile banking applications provided by a financial institution), an automated teller device channel (which may, e.g., be associated with one or more automated teller machines (ATMs), automated teller assistants (ATAs), and/or other automated teller devices operated by a financial institution), and/or one or more other channels.

At step 202, administrative computer system 140 may send authentication rules information to customer authentication computing platform 110. For example, at step 202, administrative computer system 140 may send authentication rules information to customer authentication computing platform 110 based on the input defining the one or more authentication rules received from the user of administrative computer system 140 at step 201. Such authentication rules information may, for instance, include the input defining the one or more authentication rules received from the user of administrative computer system 140 at step 201 and/or information generated by administrative computer system 140 based on the input defining the one or more authentication rules received from the user of administrative computer system 140 at step 201.

At step 203, customer authentication computing platform 110 may receive the authentication rules information from administrative computer system 140. For example, prior to receiving an authentication request from a telephone agent support computer system associated with a telephone agent channel (e.g., as discussed below), customer authentication computing platform 110 may receive, via a communication interface (e.g., communication interface 116), and from an administrative computer system (e.g., administrative computer system 140), authentication rules information defining a set of authentication rules for a telephone agent channel. At step 204, customer authentication computing platform 110 may store the authentication rules information received from administrative computer system 140. For example, at step 204, customer authentication computing platform 110 may store the authentication rules information defining the set of authentication rules for the telephone agent channel received from the administrative computer system (e.g., administrative computer system 140).

Figure 2B:
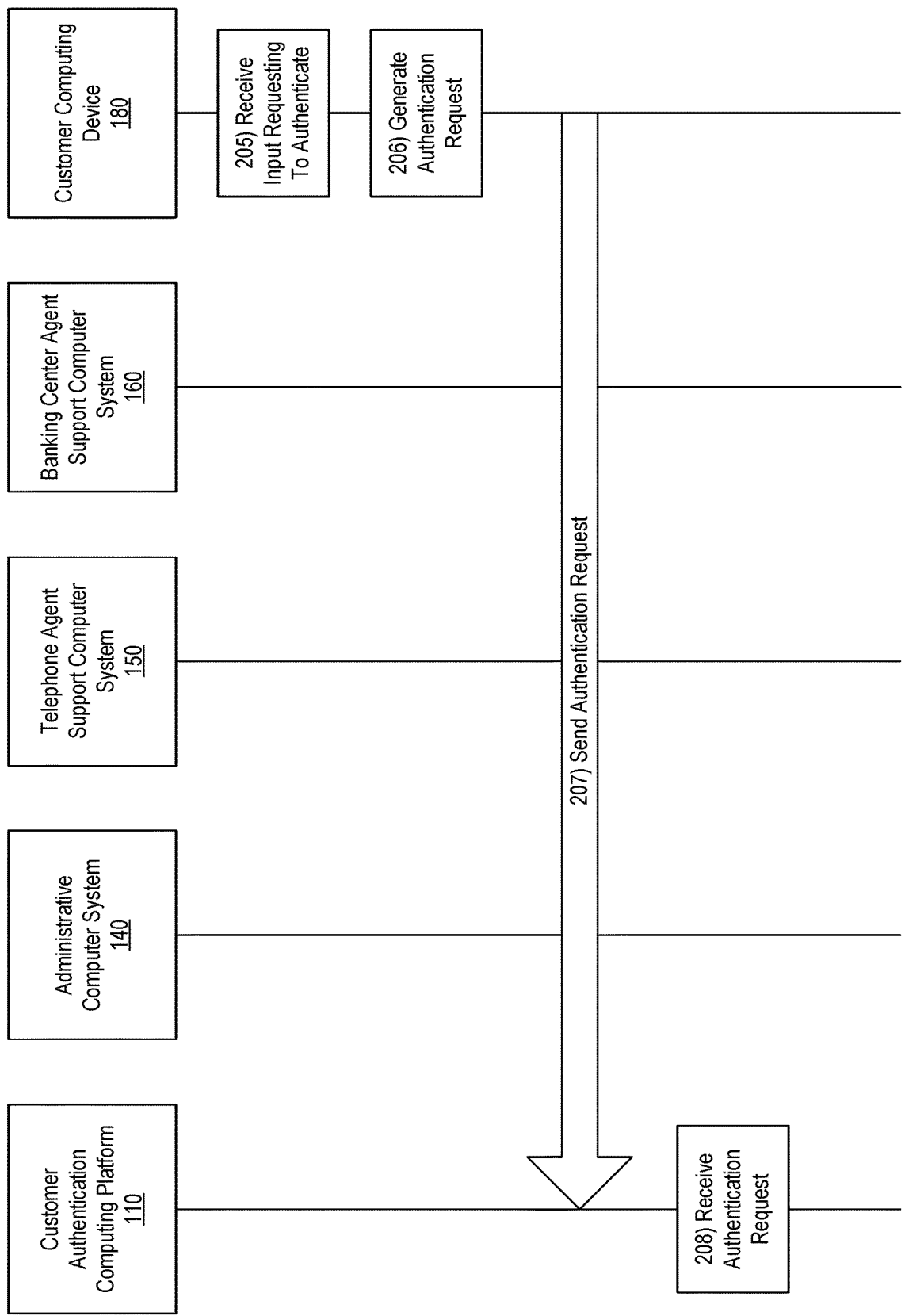

Referring to FIG. 2B, at step 205, customer computing device 180 may receive input requesting to authenticate. For example, at step 205, customer computing device 180 may receive input from a user of customer computing device 180 requesting to authenticate to an online banking portal, a mobile banking application, and/or the like. At step 206, customer computing device 180 may generate an authentication request (e.g., based on the input requesting to authenticate received from the user of customer computing device 180 at step 205). At step 207, customer computing device 180 may send the authentication request to customer authentication computing platform 110. At step 208, customer authentication computing platform 110 may receive the authentication request from customer computing device 180.

Figure 2C:
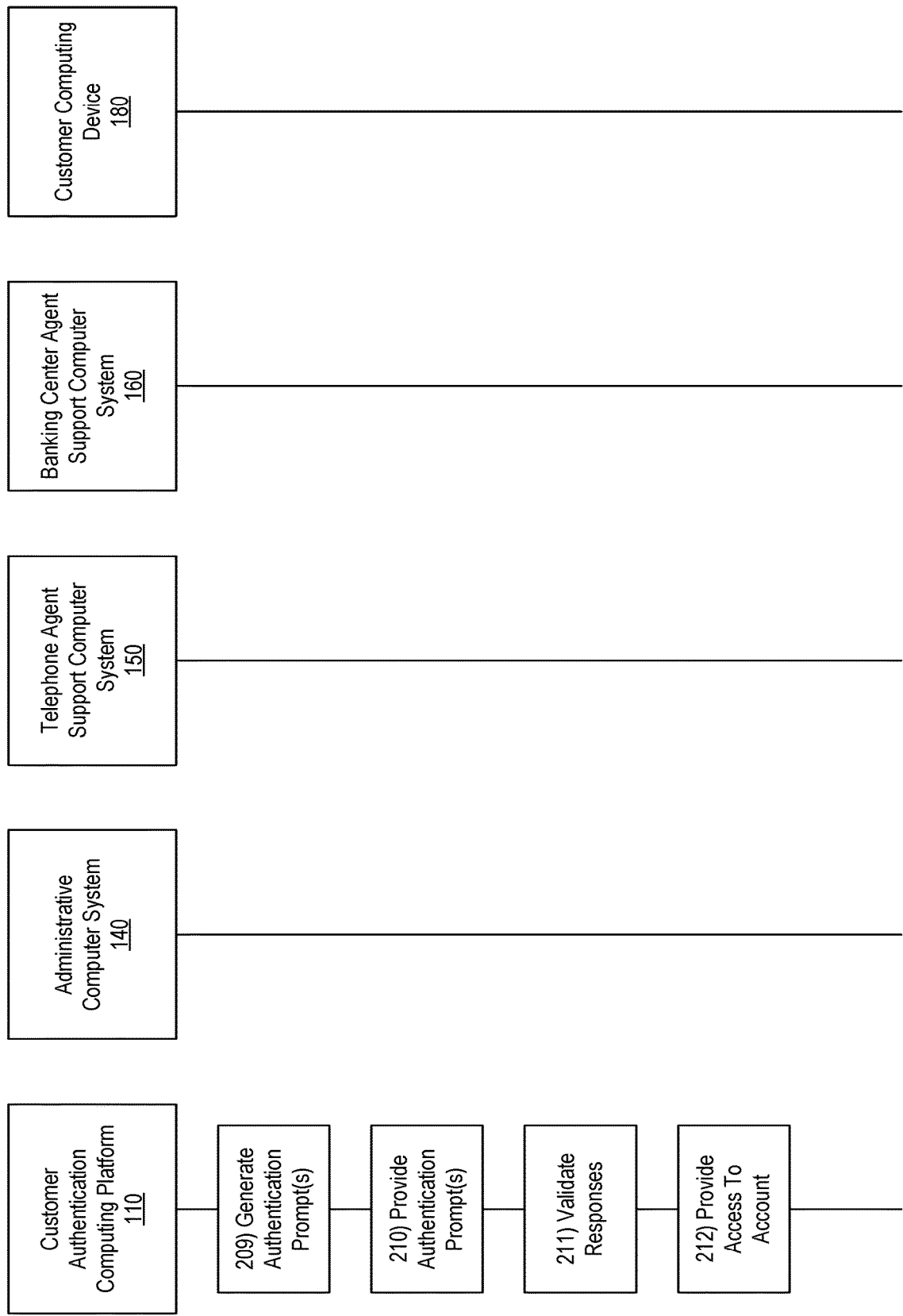

Referring to FIG. 2C, at step 209, customer authentication computing platform 110 may generate one or more authentication prompts (e.g., based on the authentication requested received from customer computing device 180 at step 208, based on the authentication rules information and/or the one or more authentication rules defined by the authentication rules information, and/or the like). In generating such authentication prompts, customer authentication computing platform 110 may, for example, create and/or form one or more prompts to be answered by the user of customer computing device 180 based on one or more authentication prompt templates (which may, e.g., be specific to the particular channel via which the user of customer computing device 180 is attempting to authenticate, such as the online banking channel). Additional examples of how such authentication prompts may be generated by customer authentication computing platform 110 are discussed in greater detail below.

Figure 4:
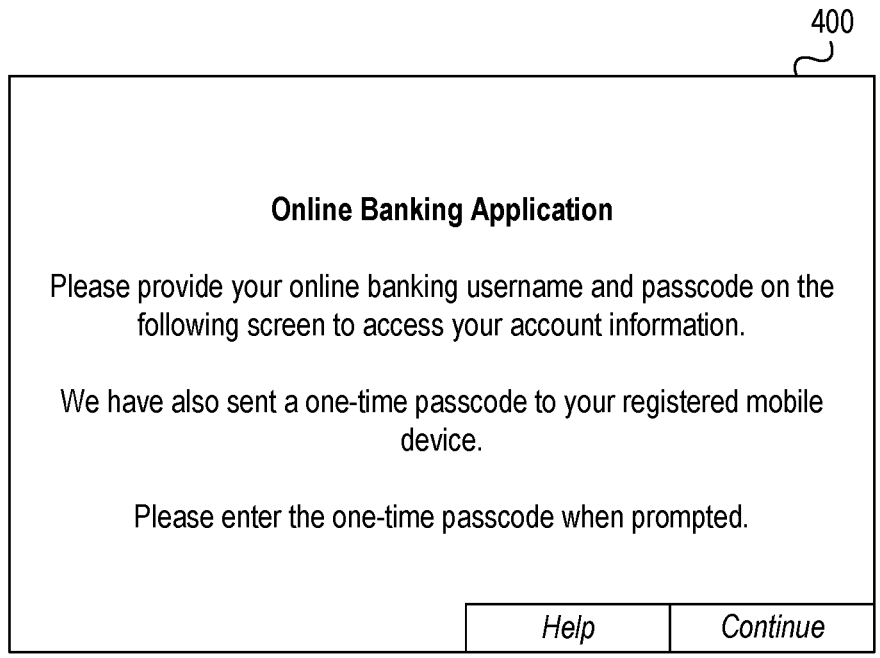

At step 210, customer authentication computing platform 110 may provide the one or more authentication prompts. For example, in providing the one or more authentication prompts at step 210, customer authentication computing platform 110 may send one or more authentication prompts to customer computing device 180 that request the user of customer computing device 180 to enter and/or otherwise provide a username, a password, one or more responses to one or more security questions, a one-time passcode, biometric input, and/or the like. Additionally or alternatively, in providing the one or more authentication prompts at step 210, customer authentication computing platform 110 may cause customer computing device 180 to display and/or otherwise present a graphical user interface similar to graphical user interface 400, which is illustrated in FIG. 4. As seen in FIG. 4, graphical user interface 400 may include information prompting the user of customer computing device 180 to enter and/or otherwise provide a username for a customer portal account, a password, and a one-time passcode.

At step 211, customer authentication computing platform 110 may validate one or more responses to the one or more authentication prompts. For example, at step 211, customer authentication computing platform 110 may validate one or more responses to the one or more authentication prompts and/or other authentication input received from customer computing device 180. In validating such authentication input, customer authentication computing platform 110 may, for instance, determine whether a username and/or password entered by the user of customer computing device 180 are correct, whether an indication of biometric input received from the user of customer computing device 180 was determined to be valid by customer computing device 180, whether one or more responses to one or more challenge questions entered by the user of customer computing device 180 are valid, whether a one-time passcode entered by the user of customer computing device 180 is valid, and/or whether other authentication input entered and/or otherwise provided by the user of customer computing device 180 is valid. If such authentication input information is determined by customer authentication computing platform 110 to be invalid and/or otherwise incorrect, customer authentication computing platform 110 may generate and/or send one or more error messages to customer computing device 180 and/or may prevent and/or deny access to customer computing device 180. Alternatively, if such authentication input information is determined by customer authentication computing platform 110 to be valid and/or otherwise correct, the event sequence may continue as illustrated in FIG. 2C (e.g., and customer authentication computing platform 110 may allow and/or otherwise provide access to customer computing device 180, as illustrated below).

At step 212, customer authentication computing platform 110 may provide access to account information (e.g., based on validating the one or more responses to the one or more authentication prompts at step 211). For example, at step 212, customer authentication computing platform 110 may provide customer computing device 180 and/or the user of customer computing device 180 with access to customer account information associated with an online banking account to which the user of customer computing device 180 has been authenticated. In providing access to such information, customer authentication computing platform 110 may, for instance, send, provide, and/or allow customer computing device 180 and/or the user of customer computing device 180 to access account information via a customer portal, an online banking portal (which may, e.g., be provided by customer portal computer system 120 and/or may allow the user of customer computing device 180 to access and/or view account information maintained by account management computer system 130), a mobile banking application, and/or the like.

Figure 2D:
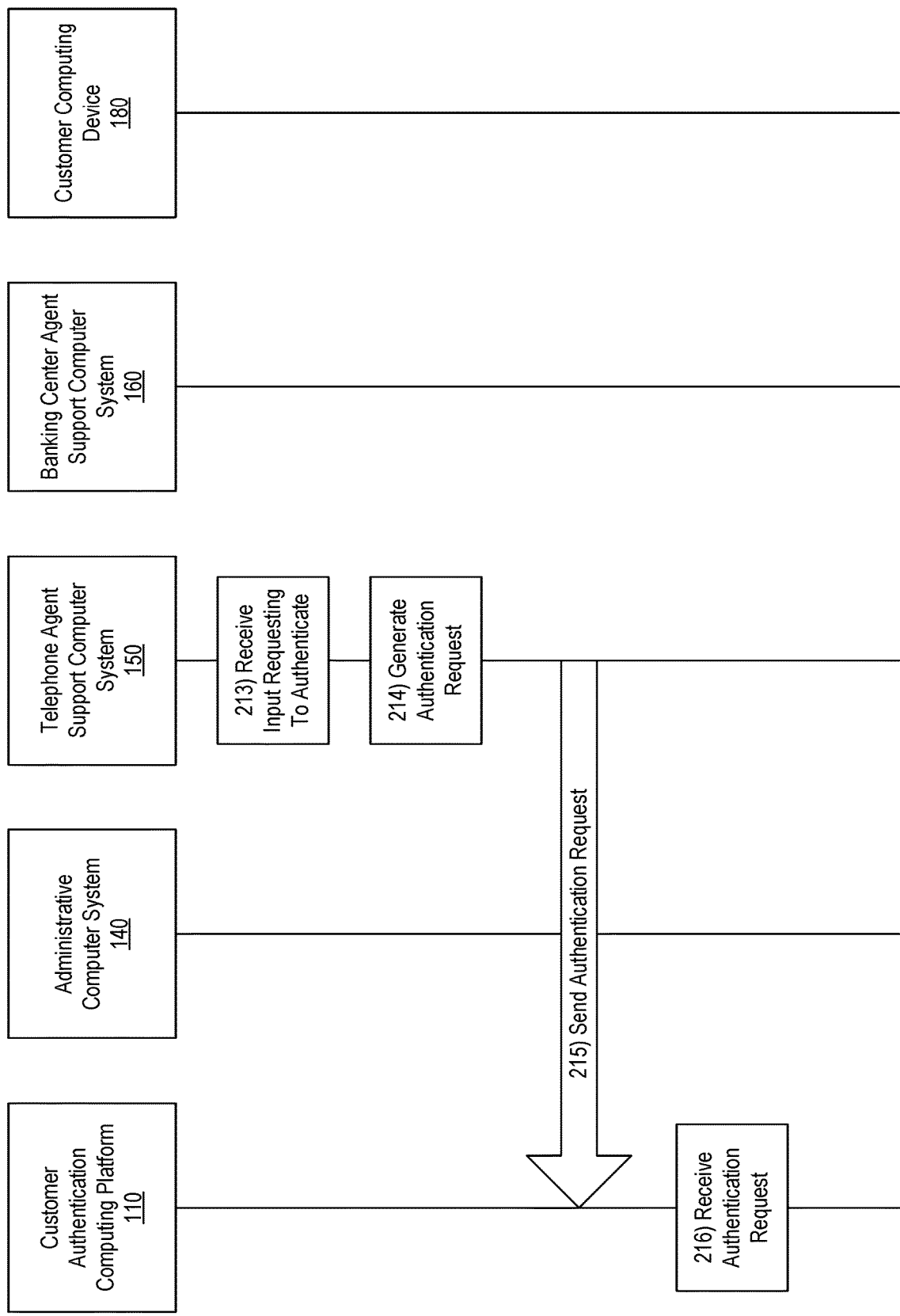

Referring to FIG. 2D, at step 213, telephone agent support computer system 150 may receive input requesting to authenticate a customer. For example, at step 213, telephone agent support computer system 150 may receive input from a user of telephone agent support computer system 150 (who may, e.g., be a customer service representative at a call center of a financial institution operating customer authentication computing platform 110) to authenticate a customer who is calling into the financial institution for assistance, and the customer may wish to authenticate to one or more accounts maintained by the financial institution using their online banking credentials (e.g., instead of using their debit card number, checking account number, and/or the like). In some instances, the input received at step 213 by telephone agent support computer system 150 may be received by a user interface component, applet, or widget that is integrated into existing systems and/or applications used by telephone customer service representatives of the financial institution. Such a user interface component, applet, or widget may, for instance, by executed on and/or by telephone agent support computer system 150 and may be presented to the customer service representative using telephone agent support computer system 150. Additionally or alternatively, the customer that is to be authenticated via telephone agent support computer system 150 at step 213 may be a different customer than the customer who was authenticated via and/or who may be using customer computing device 180.

At step 214, telephone agent support computer system 150 may generate an authentication request (e.g., based on the input requesting to authenticate the customer received by telephone agent support computer system 150 at step 213). At step 215, telephone agent support computer system 150 may send the authentication request to customer authentication computing platform 110.

At step 216, customer authentication computing platform 110 may receive the authentication request from telephone agent support computer system 150. For example, at step 216, customer authentication computing platform 110 may receive, via the communication interface (e.g., communication interface 116), and from a telephone agent support computer system associated with a telephone agent channel (e.g., telephone agent support computer system 150), an authentication request for a user account. In some embodiments, the authentication request may include information requesting to authenticate a caller as a customer of a financial institution using one or more credentials of an online banking account maintained by the financial institution for the customer. For example, the authentication request (which may, e.g., be received by customer authentication computing platform 110 from telephone agent support computer system 150 at step 216) may include information requesting to authenticate a caller as a customer of a financial institution using one or more credentials of an online banking account maintained by the financial institution for the customer. The caller may, for instance, be speaking via telephone with a customer service representative or other telephone agent of the financial institution, who may be using and/or otherwise interacting with telephone agent support computer system 150.

Figure 2E:
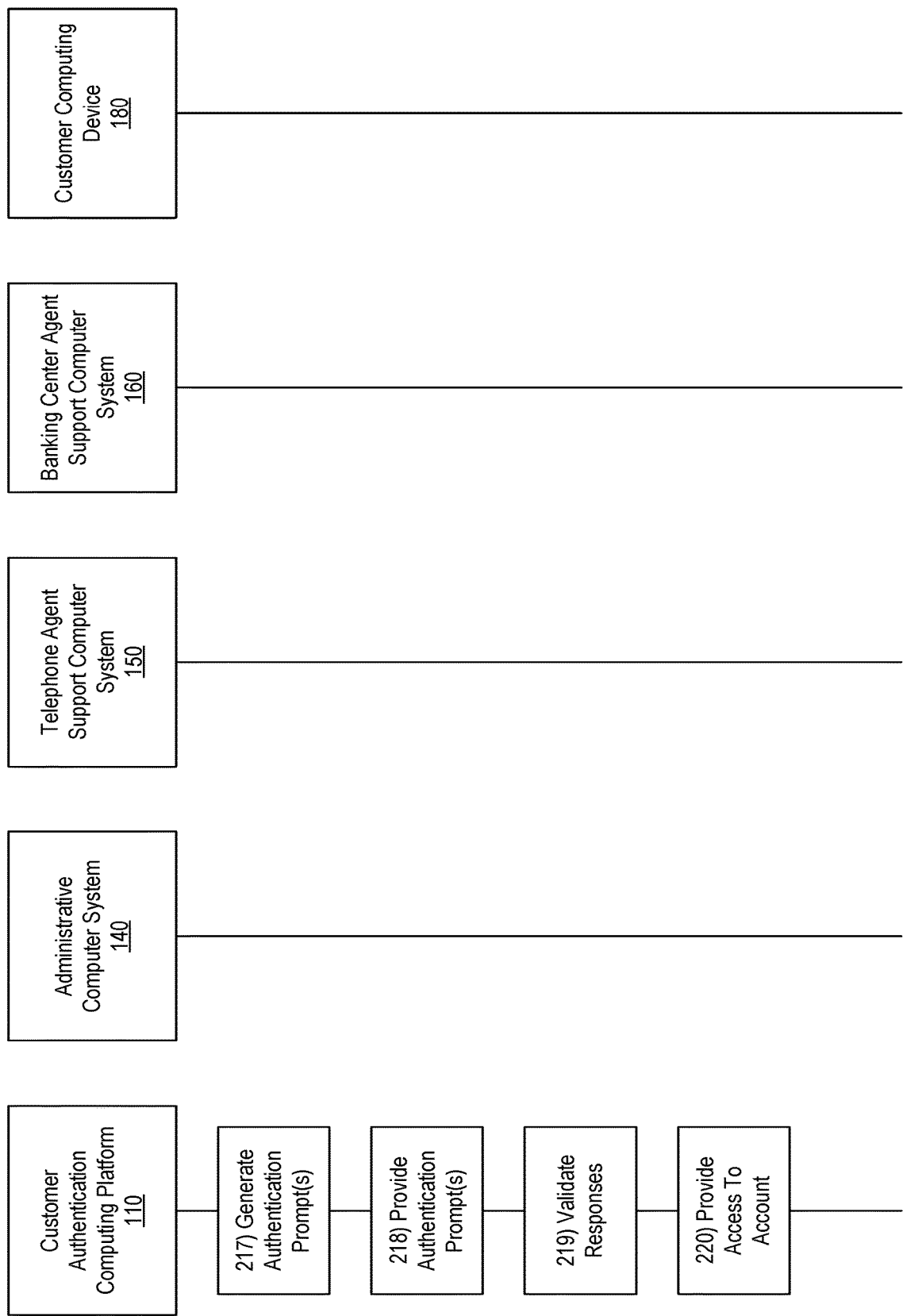

Referring to FIG. 2E, at step 217, customer authentication computing platform 110 may generate one or more authentication prompts (e.g., based on one or more authentication rules defined for a telephone channel associated with telephone agent support computer system 150). For example, at step 217, based on receiving the authentication request from the telephone agent support computer system associated with the telephone agent channel (e.g., telephone agent support computer system 150), customer authentication computing platform 110 may generate a set of one or more authentication prompts based on a set of authentication rules defined for the telephone agent channel. In generating the set of one or more authentication prompts, customer authentication computing platform 110 may, for instance, select one or more predefined authentication prompts from a set of predefined authentication prompts based on the authentication rules defined for the telephone agent channel (which may, e.g., be associated with telephone agent support computer system 150). Such a set of predefined authentication prompts may, for example, include one or more predefined authentication prompts that request a customer or user to provide a username, a password, a one-time passcode, one or more responses to one or more challenge questions, biometric input, and/or the like. In addition, one or more channel-specific rules (e.g., the set of authentication rules defined for the telephone agent channel) may dictate which prompts of the set of predefined authentication prompts are to be selected by customer authentication computing platform 110 depending on the device and/or the type of device requesting access to account information, depending on the user and/or the type of user requesting access to account information, depending on the location of the user and/or the device requesting access to account information, depending on the current time of day at which access to account information is requested, and/or based on one or more other factors. In some instances, the customer or user requesting access to account information may be authenticated (e.g., by customer authentication computing platform 110) using a combination of online banking credentials and/or one or more channel-specific authentication processes and/or policies (which may, e.g., be specific to the telephone agent channel associated with telephone agent support computer system 150).

Figure 5:
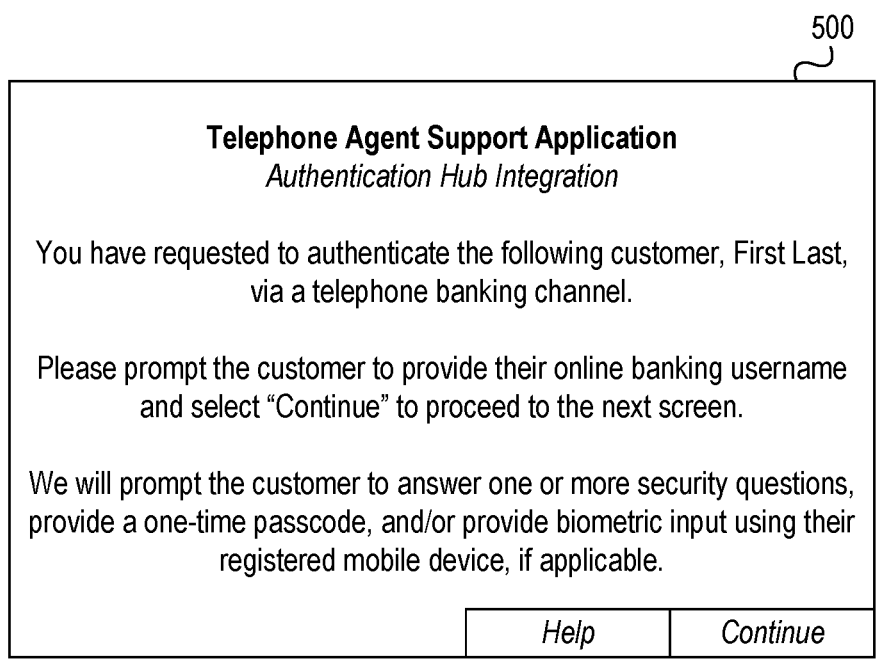

At step 218, customer authentication computing platform 110 may provide the one or more authentication prompts. For example, at step 218, customer authentication computing platform 110 may provide the set of one or more authentication prompts generated based on the set of authentication rules defined for the telephone agent channel. In providing the set of one or more authentication prompts, customer authentication computing platform 110 may, for instance, send one or more authentication prompts of the set of one or more authentication prompts to telephone agent support computer system 150 and/or to one or more other devices, such as a registered mobile device linked to the user account to which the caller or customer is requesting access. For example, customer authentication computing platform 110 may send one or more authentication prompts to telephone agent support computer system 150 that request the user of telephone agent support computer system 150 (who may, e.g., be a telephone agent of a financial institution operating customer authentication computing platform 110) to ask the caller to provide their online banking username, one or more responses to one or more security questions, a one-time passcode, and/or the like. Additionally or alternatively, customer authentication computing platform 110 may send a one-time passcode and/or a biometric input prompt to a registered mobile device linked to the user account to which the caller or customer is requesting access (which may, e.g., be customer mobile device 170). In some instances, in providing the one or more authentication prompts at step 218, customer authentication computing platform 110 may cause telephone agent support computer system 150 to display and/or otherwise present a graphical user interface similar to graphical user interface 500, which is illustrated in FIG. 5. As seen in FIG. 5, graphical user interface 500 may include information notifying the user of telephone agent support computer system 150 that the customer calling into the financial institution will be authenticated using their online banking username and one or more other credentials (e.g., by answering one or more security questions generated by customer authentication computing platform 110, by providing a one-time passcode sent to the customer's registered mobile device by customer authentication computing platform 110, and/or by providing biometric input to the customer's registered mobile device based on a prompt sent by customer authentication computing platform 110 to the customer's registered mobile device). In some instances, graphical user interface 500 may be displayed by and/or via the user interface component, applet, or widget (which may, e.g., be executed on telephone agent support computer system 150 and/or otherwise integrated into existing systems and/or applications used by telephone customer service representatives of the financial institution, as discussed above).

In some embodiments, providing the set of one or more authentication prompts generated based on the set of authentication rules defined for the telephone agent channel may include sending, via the communication interface, and to the telephone agent support computer system associated with the telephone agent channel, a message prompting a user of the telephone agent support computer system associated with the telephone agent channel to prompt the caller to provide a username associated with the online banking account maintained by the financial institution for the customer. For example, in providing the set of one or more authentication prompts generated based on the set of authentication rules defined for the telephone agent channel, customer authentication computing platform 110 may send, via the communication interface (e.g., communication interface 116), and to the telephone agent support computer system associated with the telephone agent channel (e.g., telephone agent support computer system 150), a message prompting a user of the telephone agent support computer system associated with the telephone agent channel (e.g., telephone agent support computer system 150) to prompt the caller to provide a username associated with the online banking account maintained by the financial institution for the customer. As discussed above, the user of the telephone agent support computer system associated with the telephone agent channel (e.g., telephone agent support computer system 150) may, for instance, be a telephone agent or other customer service representative of the financial institution operating customer authentication computing platform 110.

In some embodiments, providing the set of one or more authentication prompts generated based on the set of authentication rules defined for the telephone agent channel may include sending, via the communication interface, and to the telephone agent support computer system associated with the telephone agent channel, a message prompting a user of the telephone agent support computer system associated with the telephone agent channel to prompt the caller to provide a response to a security question associated with the online banking account maintained by the financial institution for the customer. For example, in providing the set of one or more authentication prompts generated based on the set of authentication rules defined for the telephone agent channel, customer authentication computing platform 110 may send, via the communication interface (e.g., communication interface 116), and to the telephone agent support computer system associated with the telephone agent channel (e.g., telephone agent support computer system 150), a message prompting a user of the telephone agent support computer system associated with the telephone agent channel (e.g., telephone agent support computer system 150) to prompt the caller to provide a response to a security question associated with the online banking account maintained by the financial institution for the customer. In some instances, the security question associated with the online banking account maintained by the financial institution for the customer (which may, e.g., used in prompting the caller when providing the set of one or more authentication prompts) may be generated based on authentication history information, such as login history information and/or usage history information, as discussed in greater detail below.

In some embodiments, providing the set of one or more authentication prompts generated based on the set of authentication rules defined for the telephone agent channel may include sending, via the communication interface, and to a customer mobile device registered to the customer of the financial institution, a one-time passcode; and sending, via the communication interface, and to the telephone agent support computer system associated with the telephone agent channel, a message prompting a user of the telephone agent support computer system associated with the telephone agent channel to prompt the caller to provide the one-time passcode. For example, in providing the set of one or more authentication prompts generated based on the set of authentication rules defined for the telephone agent channel, customer authentication computing platform 110 may send, via the communication interface (e.g., communication interface 116), and to a customer mobile device registered to the customer of the financial institution (e.g., customer mobile device 170), a one-time passcode. In addition, in providing the set of one or more authentication prompts generated based on the set of authentication rules defined for the telephone agent channel, customer authentication computing platform 110 may send, via the communication interface (e.g., communication interface 116), and to the telephone agent support computer system associated with the telephone agent channel (e.g., telephone agent support computer system 150), a message prompting a user of the telephone agent support computer system associated with the telephone agent channel (e.g., telephone agent support computer system 150) to prompt the caller to provide the one-time passcode. In this way, the telephone agent or customer service representative using telephone agent support computer system 150 may verify a one-time passcode sent by customer authentication computing platform 110 to a registered mobile device linked to the user account to which the caller or customer is requesting access.

In some embodiments, providing the set of one or more authentication prompts generated based on the set of authentication rules defined for the telephone agent channel may include sending, via the communication interface, and to a customer mobile device registered to the customer of the financial institution, a biometric input prompt; and receiving, via the communication interface, and from the customer mobile device registered to the customer of the financial institution, biometric validation input. For example, in providing the set of one or more authentication prompts generated based on the set of authentication rules defined for the telephone agent channel, customer authentication computing platform 110 may send, via the communication interface (e.g., communication interface 116), and to a customer mobile device registered to the customer of the financial institution (e.g., customer mobile device 170), a biometric input prompt. In addition, in providing the set of one or more authentication prompts generated based on the set of authentication rules defined for the telephone agent channel, customer authentication computing platform 110 may receive, via the communication interface (e.g., communication interface 116), and from the customer mobile device registered to the customer of the financial institution (e.g., customer mobile device 170), biometric validation input. In some instances, the biometric input prompt may prompt the user of customer mobile device 170 to provide biometric input for validation (e.g., fingerprint biometric input, voice biometric input, facial scan biometric input, retinal scan biometric input, and/or other biometric input), and such biometric input may be validated by customer mobile device 170 and/or by customer authentication computing platform 110. For instance, the biometric validation input received by customer authentication computing platform 110 may include the actual biometric input provided by the user of customer mobile device 170 (e.g., to be validated by customer authentication computing platform 110 itself) and/or an indication from customer mobile device 170 that the biometric input provided by the user of customer mobile device 170 was confirmed to be valid (e.g., by customer mobile device 170 itself).

In some embodiments, providing the set of one or more authentication prompts generated based on the set of authentication rules defined for the telephone agent channel may include sending at least one authentication prompt to an omni-channel user interface component integrated into an application executed by the telephone agent support computer system. For example, in providing the set of one or more authentication prompts generated based on the set of authentication rules defined for the telephone agent channel, customer authentication computing platform 110 may send at least one authentication prompt to an omni-channel user interface component integrated into an application executed by the telephone agent support computer system (e.g., telephone agent support computer system 150). Such a user interface component may, for example, be executed by telephone agent support computer system 150 and/or integrated into one or more telephone-channel-specific applications executed on telephone agent support computer system 150 and used by one or more customer service representatives of the financial institution to provide unified authentication services and a back-end linkage to a central authentication hub (e.g., customer authentication computing platform 110) of the organization.

Referring again to FIG. 2E, at step 219, customer authentication computing platform 110 may validate one or more responses to the one or more authentication prompts. For example, at step 219, customer authentication computing platform 110 may validate one or more responses to the set of one or more authentication prompts generated based on the set of authentication rules defined for the telephone agent channel.

At step 220, customer authentication computing platform 110 may provide access to account information (e.g., based on validating the one or more responses to the one or more authentication prompts at step 219). For example, based on validating the one or more responses to the set of one or more authentication prompts generated based on the set of authentication rules defined for the telephone agent channel (e.g., at step 219), customer authentication computing platform 110 may provide user account information associated with the user account to the telephone agent support computer system associated with the telephone agent channel (e.g., telephone agent support computer system 150). In some instances, in providing user account information at step 219, customer authentication computing platform 110 may, for example, provide telephone agent support computer system 150 with access to account information (e.g., by sending, receiving, and/or otherwise exchanging such information and/or other information with telephone agent support computer system 150, by allowing and/or enabling telephone agent support computer system 150 to access one or more computer systems on which such account information is stored and/or otherwise maintained, and/or the like). Additionally or alternatively, in providing user account information at step 219, customer authentication computing platform 110 may provide telephone agent support computer system 150 with an indication that a customer has been successfully authenticated to one or more user accounts, as this may, for instance, enable the user of telephone agent support computer system 150 to assist the customer (who may, e.g., be calling into the financial institution for assistance) in obtaining account information, resolving questions about account balances, requesting one or more transactions to be executed, and/or the like.

In some embodiments, providing the user account information associated with the user account to the telephone agent support computer system associated with the telephone agent channel may include sending at least a portion of the user account information associated with the user account to the omni-channel user interface component integrated into the application executed by the telephone agent support computer system. For example, in providing the user account information associated with the user account to the telephone agent support computer system associated with the telephone agent channel (e.g., telephone agent support computer system 150), customer authentication computing platform 110 may send at least a portion of the user account information associated with the user account to the omni-channel user interface component integrated into the application executed by the telephone agent support computer system (e.g., telephone agent support computer system 150). In some instances, the omni-channel user interface component integrated into the application executed by the telephone agent support computer system (e.g., telephone agent support computer system 150) may be configured to display and/or otherwise present such account information (which may, e.g., include account balance information), process one or more transactions requests, modify the customer's online banking credentials (e.g., by modifying the customer's online banking username, by resetting the customer's password, and/or the like), and/or provide other functions.

In some embodiments, providing the user account information associated with the user account to the telephone agent support computer system associated with the telephone agent channel may include sending a message indicating that the caller has been authenticated to the omni-channel user interface component integrated into the application executed by the telephone agent support computer system. For example, in providing the user account information associated with the user account to the telephone agent support computer system associated with the telephone agent channel (e.g., telephone agent support computer system 150), customer authentication computing platform 110 may send a message indicating that the caller has been authenticated to the omni-channel user interface component integrated into the application executed by the telephone agent support computer system (e.g., telephone agent support computer system 150). In some instances, the omni-channel user interface component integrated into the application executed by the telephone agent support computer system (e.g., telephone agent support computer system 150) may be configured to display and/or otherwise present such a message to a user of telephone agent support computer system 150 (who may, e.g., be a telephone agent or other customer service representative of the financial institution operating customer authentication computing platform 110), as this may enable the user of telephone agent support computer system 150 to submit, handle, and/or process one or more requests of the caller and/or otherwise assist the caller after they have been successfully authenticated.

Referring to FIG. 2F, at step 221, telephone agent support computer system 150 may receive input requesting to update a customer portal account (e.g., an online banking account). For instance, telephone agent support computer system 150 may receive input requesting to reset a password of the caller's customer portal account, modify and/or change a username of the caller's customer portal account, and/or otherwise update information associated with the caller's customer portal account. In some instances, such input may be received by telephone agent support computer system 150 at step 221 via the omni-channel user interface component integrated into the application executed by the telephone agent support computer system (e.g., telephone agent support computer system 150). At step 222, telephone agent support computer system 150 may send an account update request to customer authentication computing platform 110 (e.g., based on the input requesting to update the customer portal account received by telephone agent support computer system 150 from the user of telephone agent support computer system 150 at step 221).

At step 223, customer authentication computing platform 110 may receive the account update request from telephone agent support computer system 150. For example, at step 223, customer authentication computing platform 110 may receive, via the communication interface (e.g., communication interface 116), and from the telephone agent support computer system associated with the telephone agent channel (e.g., telephone agent support computer system 150), an account update request. In some instances, such an account update request may be generated and/or sent to customer authentication computing platform 110 by the omni-channel user interface component integrated into the application executed by the telephone agent support computer system (e.g., telephone agent support computer system 150).

At step 224, customer authentication computing platform 110 may update the customer portal account based on the account update request received from telephone agent support computer system 150. For example, at step 224, customer authentication computing platform 110 may update the online banking account maintained by the financial institution for the customer based on the account update request received from the telephone agent support computer system associated with the telephone agent channel (e.g., telephone agent support computer system 150). For instance, in updating the online banking account maintained by the financial institution for the customer based on the account update request received from the telephone agent support computer system associated with the telephone agent channel (e.g., telephone agent support computer system 150), customer authentication computing platform 110 may reset a password for the online banking account, change and/or otherwise modify a username for the online banking account, change and/or otherwise modify one or more security preferences for the online banking account (which may, e.g., enroll and/or de-enroll the online banking account from a one-time passcode program, a biometric authentication program, and/or the like), and/or otherwise modify one or more aspects of the online banking account based on the account update request (which may, e.g., be generated and/or sent to customer authentication computing platform 110 by the omni-channel user interface component integrated into the application executed by telephone agent support computer system 150).

Figure 2G:
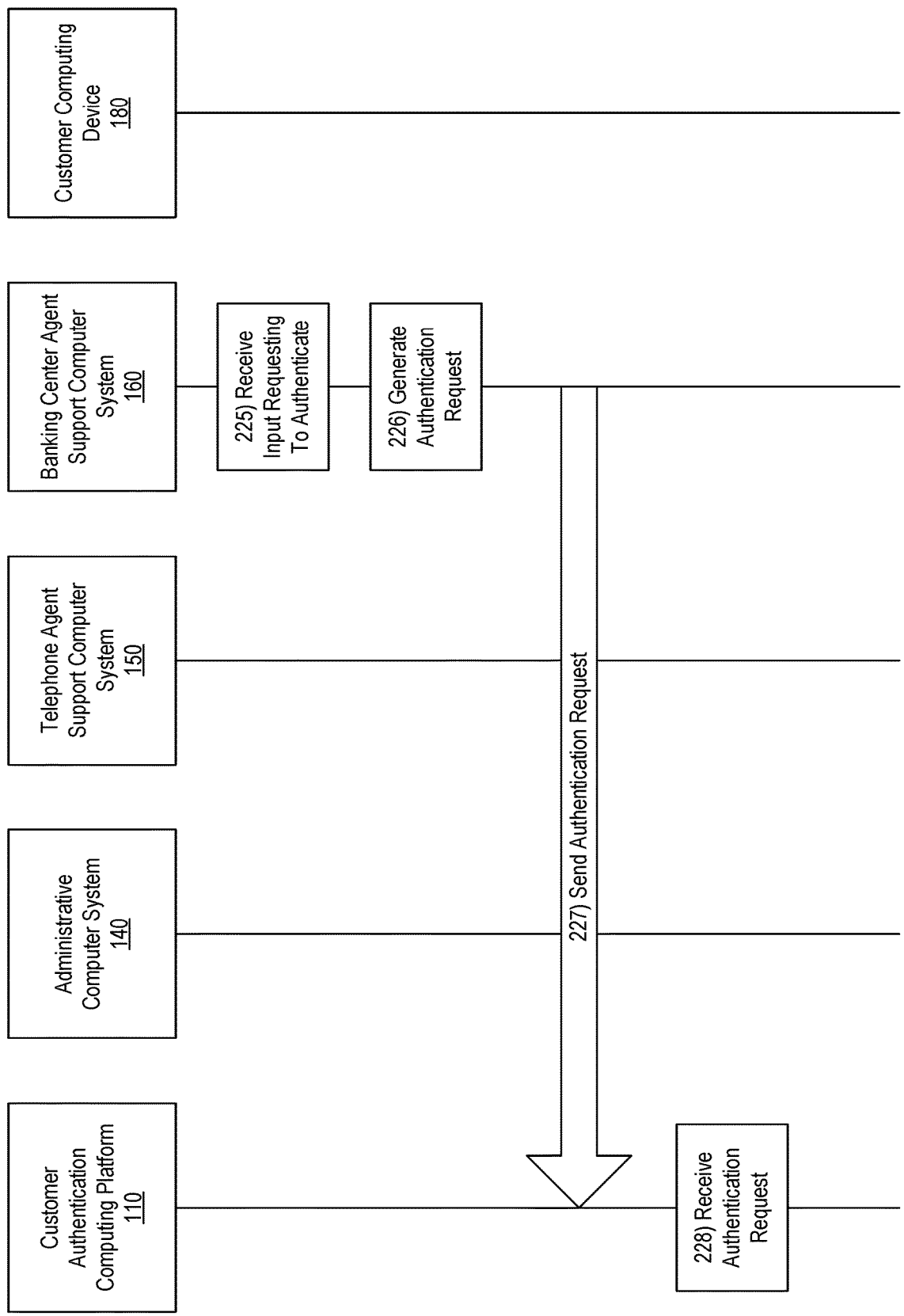

Referring to FIG. 2G, at step 225, banking center agent support computer system 160 may receive input requesting to authenticate a customer. For example, at step 225, banking center agent support computer system 160 may receive input requesting to authenticate a customer from a teller at a banking center who may be using and/or otherwise interacting with banking center agent support computer system 160. The customer may, for instance, be visiting the banking center and may wish to authenticate using his or her online banking credentials (e.g., instead of using his or her driver's license, debit card, and/or the like), and as illustrated below, the interaction between banking center agent support computer system 160 and customer authentication computing platform 110 may enable the customer to be authenticated using his or her online banking credentials. In some instances, the input received at step 225 by banking center agent support computer system 160 may be received by a user interface component, applet, or widget that is integrated into existing systems and/or applications used by bank tellers and/or other retail associates of the financial institution. Such a user interface component, applet, or widget may, for instance, by executed on and/or by banking center agent support computer system 160 and may be presented to the retail associate using banking center agent support computer system 160. Additionally or alternatively, the customer that is to be authenticated via banking center agent support computer system 160 at step 225 may be a different customer than the customer who was authenticated via and/or who may be using customer computing device 180 and/or than the customer who was authenticated via telephone agent support computer system 150.

At step 226, banking center agent support computer system 160 may generate an authentication request (e.g., based on the input requesting to authenticate the customer received from the user of banking center agent support computer system 160 at step 225). At step 227, banking center agent support computer system 160 may send the authentication request to customer authentication computing platform 110.

At step 228, customer authentication computing platform 110 may receive the authentication request from banking center agent support computer system 160. For example, at step 228, customer authentication computing platform 110 may receive, via the communication interface (e.g., communication interface 116), and from a banking center agent support computer system associated with a banking center channel (e.g., banking center agent support computer system 160), a second authentication request for a second user account.

In some embodiments, the second authentication request may include information requesting to authenticate a visitor to a banking center as a second customer of the financial institution using one or more credentials of a second online banking account maintained by the financial institution for the second customer. For example, the second authentication request (which may be received by customer authentication computing platform 110 at step 228) may include information requesting to authenticate a visitor to a banking center as a second customer of the financial institution using one or more credentials of a second online banking account maintained by the financial institution for the second customer.

Figure 2H:
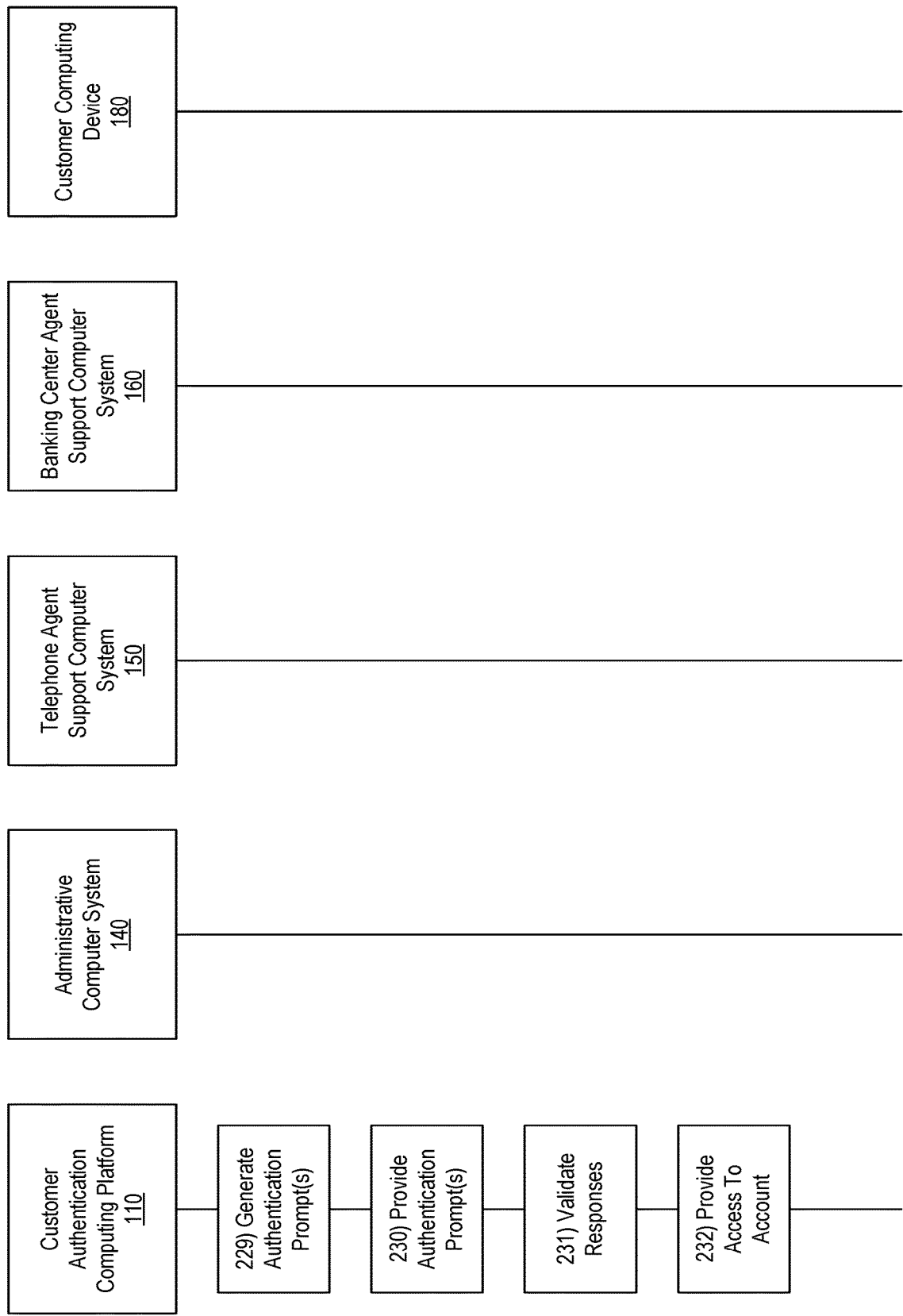
Figure 21:
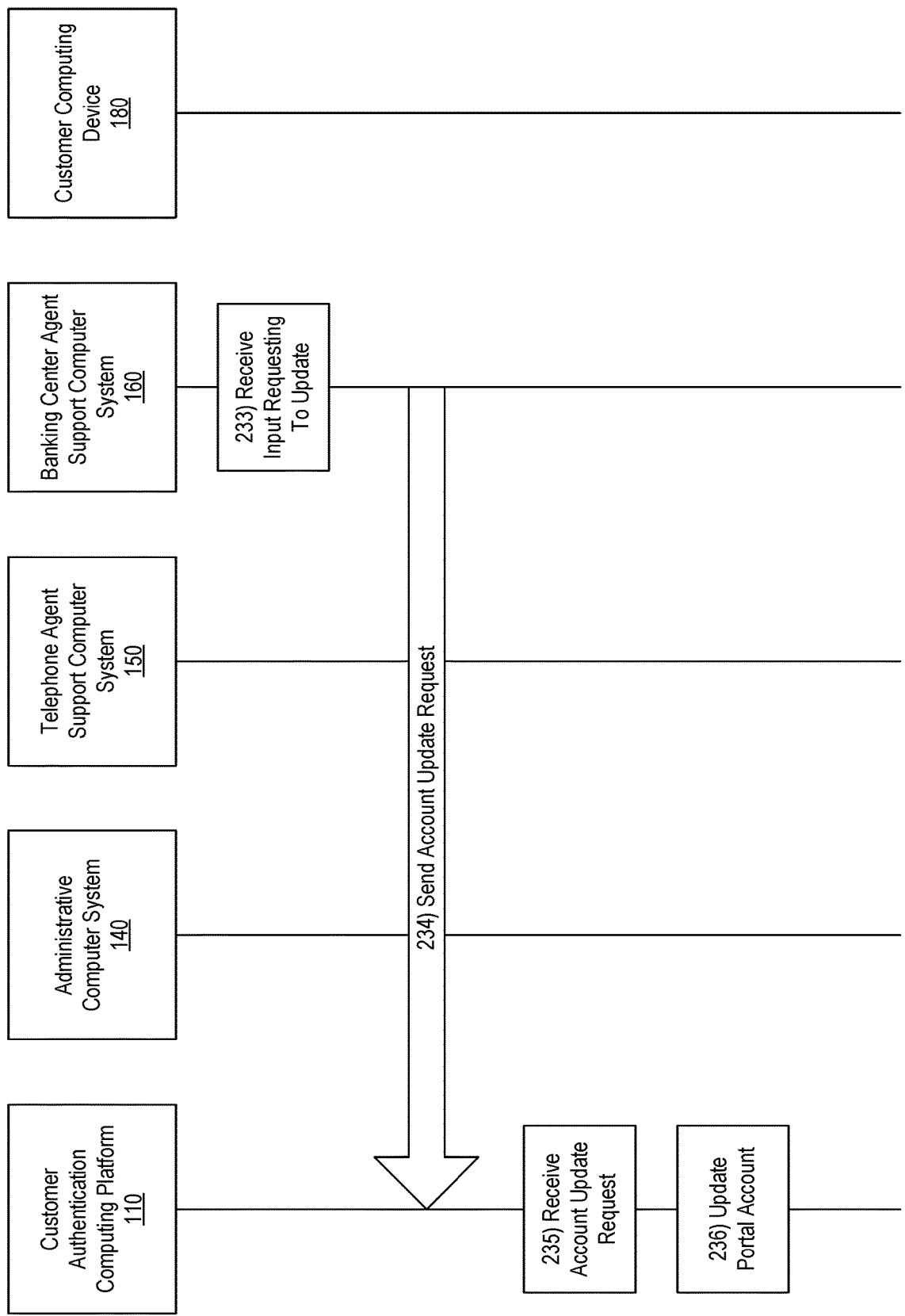

Referring to FIG. 2H, at step 229, customer authentication computing platform 110 may generate one or more authentication prompts (e.g., based on one or more authentication rules defined for an in-person banking channel associated with banking center agent support computer system 160). For example, at step 229, based on receiving the second authentication request for the second user account from the banking center agent support computer system associated with the banking center channel (e.g., banking center agent support computer system 160), customer authentication computing platform 110 may generate a second set of one or more authentication prompts based on a second set of authentication rules defined for the banking center channel. In some instances, the second set of authentication rules defined for the banking center channel (which may, e.g., be used by customer authentication computing platform 110 in generating one or more authentication prompts at step 229) may be different from the first set of authentication rules defined for the telephone agent channel (which may, e.g., be used by customer authentication computing platform 110 in generating one or more authentication prompts at step 217).

At step 230, customer authentication computing platform 110 may provide the one or more authentication prompts. For example, at step 230, customer authentication computing platform 110 may provide the second set of one or more authentication prompts generated based on the second set of authentication rules defined for the banking center channel. In providing the second set of one or more authentication prompts, customer authentication computing platform 110 may, for instance, send one or more authentication prompts of the second set of one or more authentication prompts to banking center agent support computer system 160 and/or to one or more other devices, such as a registered mobile device linked to the user account to which the visitor to the banking center or customer is requesting access. For example, customer authentication computing platform 110 may send one or more authentication prompts to banking center agent support computer system 160 that request the user of banking center agent support computer system 160 (who may, e.g., be a retail associate of a financial institution operating customer authentication computing platform 110) to ask the visitor to the banking center to provide their online banking username, one or more responses to one or more security questions, a one-time passcode, and/or the like. Additionally or alternatively, customer authentication computing platform 110 may send a one-time passcode and/or a biometric input prompt to a registered mobile device linked to the user account to which the visitor to the banking center or customer is requesting access (which may, e.g., be customer mobile device 170). In some instances, in providing the second set of one or more authentication prompts at step 230, customer authentication computing platform 110 may cause banking center agent support computer system 160 to display and/or otherwise present a graphical user interface similar to graphical user interface 600, which is illustrated in FIG. 6. As seen in FIG. 6, graphical user interface 600 may include information notifying the user of banking center agent support computer system 160 that the visitor to the banking center will be authenticated using their online banking username and one or more other credentials (e.g., by answering one or more security questions generated by customer authentication computing platform 110, by providing a one-time passcode sent to the customer's registered mobile device by customer authentication computing platform 110, and/or by providing biometric input to the customer's registered mobile device based on a prompt sent by customer authentication computing platform 110 to the customer's registered mobile device). In some instances, graphical user interface 600 may be displayed by and/or via the user interface component, applet, or widget (which may, e.g., be executed on banking center agent support computer system 160 and/or otherwise integrated into existing systems and/or applications used by bank tellers and/or retail associates of the financial institution, as discussed above).

In some embodiments, providing the second set of one or more authentication prompts generated based on the second set of authentication rules defined for the banking center channel may include sending at least one authentication prompt to an omni-channel user interface component integrated into an application executed by the banking center agent support computer system associated with the banking center channel. For example, in providing the second set of one or more authentication prompts generated based on the second set of authentication rules defined for the banking center channel, customer authentication computing platform 110 may send at least one authentication prompt to an omni-channel user interface component integrated into an application executed by the banking center agent support computer system associated with the banking center channel (e.g., banking center agent support computer system 160). Such a user interface component may, for example, be executed by banking center agent support computer system 160 and/or integrated into one or more banking-center-channel-specific applications executed on banking center agent support computer system 160 and used by one or more retail associates of the financial institution to provide unified authentication services and a back-end linkage to a central authentication hub (e.g., customer authentication computing platform 110) of the organization.

At step 231, customer authentication computing platform 110 may validate one or more responses to the one or more authentication prompts. For example, at step 231, customer authentication computing platform 110 may validate one or more responses to the second set of one or more authentication prompts generated based on the second set of authentication rules defined for the banking center channel.

At step 232, customer authentication computing platform 110 may provide access to account information (e.g., based on validating the one or more responses to the one or more authentication prompts at step 231). For example, based on validating the one or more responses to the second set of one or more authentication prompts generated based on the second set of authentication rules defined for the banking center channel (e.g., at step 231), customer authentication computing platform 110 may provide second user account information associated with the second user account to the banking center agent support computer system associated with the banking center channel (e.g., banking center agent support computer system 160). In some instances, in providing user account information at step 232, customer authentication computing platform 110 may, for example, provide banking center agent support computer system 160 with access to account information (e.g., by sending, receiving, and/or otherwise exchanging such information and/or other information with banking center agent support computer system 160, by allowing and/or enabling banking center agent support computer system 160 to access one or more computer systems on which such account information is stored and/or otherwise maintained, and/or the like). Additionally or alternatively, in providing user account information at step 232, customer authentication computing platform 110 may provide banking center agent support computer system 160 with an indication that a customer has been successfully authenticated to one or more user accounts, as this may, for instance, enable the user of banking center agent support computer system 160 to assist the customer (who may, e.g., be visiting the banking center of the financial institution for assistance) in obtaining account information, resolving questions about account balances, requesting one or more transactions to be executed, and/or the like.

In some embodiments, providing the second user account information associated with the second user account to the banking center agent support computer system associated with the banking center channel may include sending at least a portion of the second user account information associated with the second user account to the omni-channel user interface component integrated into the application executed by the banking center agent support computer system associated with the banking center channel. For example, in providing the second user account information associated with the second user account to the banking center agent support computer system associated with the banking center channel (e.g., banking center agent support computer system 160), customer authentication computing platform 110 may send at least a portion of the second user account information associated with the second user account to the omni-channel user interface component integrated into the application executed by the banking center agent support computer system associated with the banking center channel (e.g., banking center agent support computer system 160). In some instances, the omni-channel user interface component integrated into the application executed by the banking center agent support computer system associated with the banking center channel (e.g., banking center agent support computer system 160) may be configured to display and/or otherwise present such account information (which may, e.g., include account balance information), process one or more transactions requests, modify the customer's online banking credentials (e.g., by modifying the customer's online banking username, by resetting the customer's password, and/or the like), and/or provide other functions.

In some embodiments, providing the second user account information associated with the second user account to the banking center agent support computer system associated with the banking center channel may include sending a message indicating that the visitor to the banking center has been authenticated to the omni-channel user interface component integrated into the application executed by the banking center agent support computer system associated with the banking center channel. For example, in providing the second user account information associated with the second user account to the banking center agent support computer system associated with the banking center channel (e.g., banking center agent support computer system 160), customer authentication computing platform 110 may send a message indicating that the visitor to the banking center has been authenticated to the omni-channel user interface component integrated into the application executed by the banking center agent support computer system associated with the banking center channel (e.g., banking center agent support computer system 160). In some instances, the omni-channel user interface component integrated into the application executed by the banking center agent support computer system associated with the banking center channel (e.g., banking center agent support computer system 160) may be configured to display and/or otherwise present such a message to a user of banking center agent support computer system 160 (who may, e.g., be a bank teller or other retail associate of the financial institution operating customer authentication computing platform 110), as this may enable the user of banking center agent support computer system 160 to submit, handle, and/or process one or more requests of the visitor to the banking center and/or otherwise assist the visitor to the banking center after they have been successfully authenticated.

Referring to FIG. 2I, at step 233, banking center agent support computer system 160 may receive input requesting to update a customer portal account (e.g., an online banking account). For instance, banking center agent support computer system 160 may receive input requesting to reset a password of the visitor's customer portal account, modify and/or change a username of the visitor's customer portal account, and/or otherwise update information associated with the visitor's customer portal account. In some instances, such input may be received by banking center agent support computer system 160 at step 233 via the omni-channel user interface component integrated into the application executed by the banking center agent support computer system associated with the banking center channel (e.g., banking center agent support computer system 160). At step 234, banking center agent support computer system 160 may send an account update request to customer authentication computing platform 110 (e.g., based on the input requesting to update the customer portal account received by banking center agent support computer system 160 from the user of banking center agent support computer system 160 at step 233).

At step 235, customer authentication computing platform 110 may receive the account update request from banking center agent support computer system 160. At step 236, customer authentication computing platform 110 may update the customer portal account based on the account update request received from banking center agent support computer system 160 (e.g., similar to how customer authentication computing platform 110 may update an online banking account at step 224).

In some embodiments, one or more steps of the example event sequence discussed above may be repeated with respect to an online banking user (who may, e.g., be using customer mobile device 170, customer computing device 180, and/or the like). For example, customer authentication computing platform 110 may receive, via the communication interface (e.g., communication interface 116), and from a customer portal computer system associated with an online banking channel (e.g., customer portal computer system 120), a third authentication request for a third user account.

Based on receiving the third authentication request for the third user account from the customer portal computer system associated with the online banking channel (e.g., customer portal computer system 120), customer authentication computing platform 110 may generate a third set of one or more authentication prompts based on a third set of authentication rules defined for the online banking channel. Subsequently, customer authentication computing platform 110 may provide the third set of one or more authentication prompts generated based on the third set of authentication rules defined for the online banking channel.

Next, customer authentication computing platform 110 may validate one or more responses to the third set of one or more authentication prompts generated based on the third set of authentication rules defined for the online banking channel. Based on validating the one or more responses to the third set of one or more authentication prompts generated based on the third set of authentication rules defined for the online banking channel, customer authentication computing platform 110 may provide third user account information associated with the third user account to the customer portal computer system associated with the online banking channel (e.g., customer portal computer system 120).

In some embodiments, the third authentication request may include information requesting to authenticate a user of an online banking portal as a third customer of the financial institution using one or more credentials of a third online banking account maintained by the financial institution for the third customer. For example, the third authentication request (which may, e.g., be received by customer authentication computing platform 110) may include information requesting to authenticate a user of an online banking portal as a third customer of the financial institution using one or more credentials of a third online banking account maintained by the financial institution for the third customer.

Figure 3A:
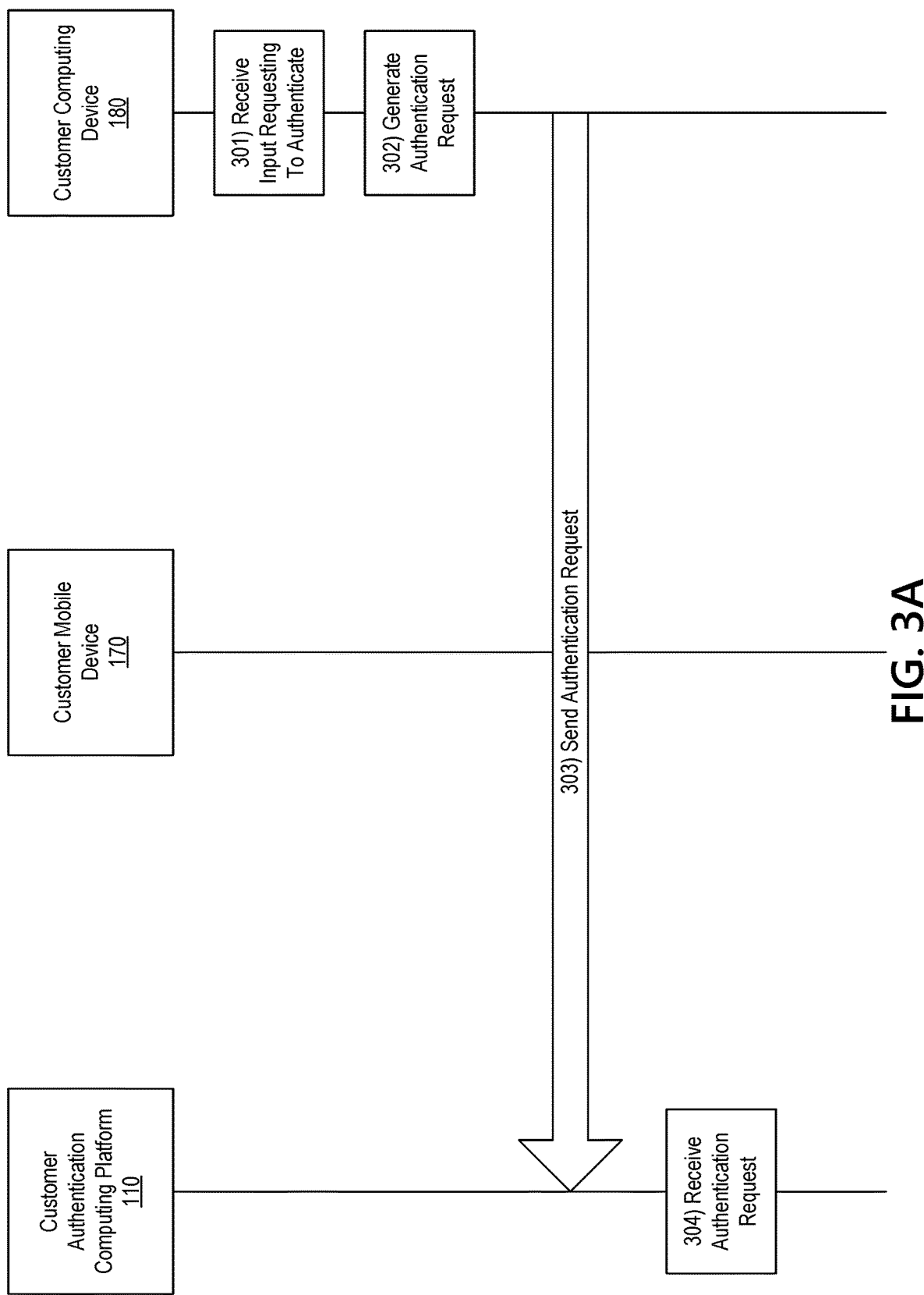

FIGS. 3A-3G depict an illustrative event sequence for dynamically authenticating end user clients using historical information in accordance with one or more example embodiments. Referring to FIG. 3A, at step 301, customer computing device 180 may receive input requesting to authenticate. For example, at step 301, customer computing device 180 may receive input from a user of customer computing device 180 requesting to authenticate to an online banking portal, a mobile banking application, and/or the like. At step 302, customer computing device 180 may generate an authentication request (e.g., based on the input requesting to authenticate received by customer computing device 180 from the user of customer computing device 180 at step 301). At step 303, customer computing device 180 may send the authentication request to customer authentication computing platform 110. At step 304, customer authentication computing platform 110 may receive the authentication request from customer computing device 180.

Figure 3B:
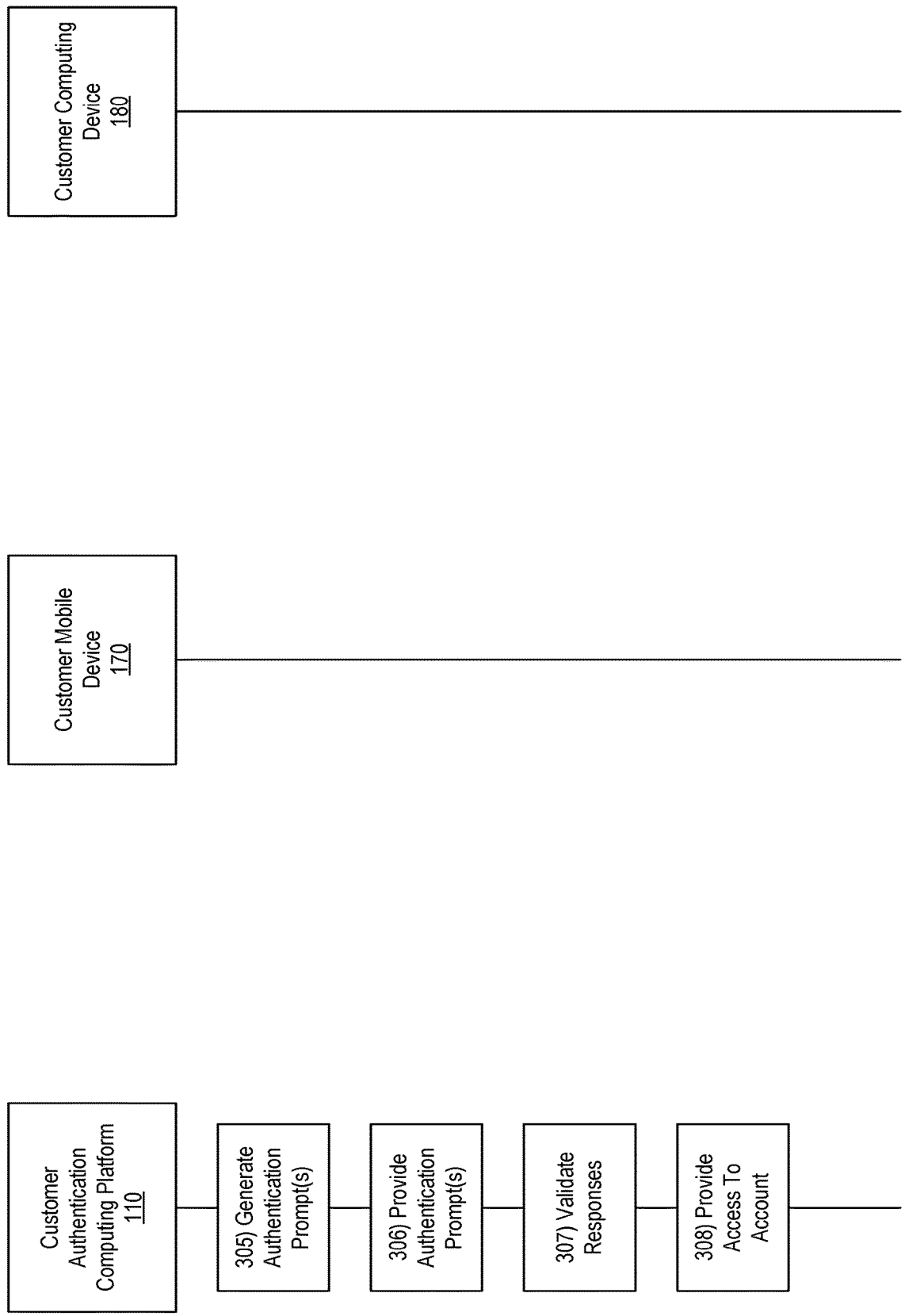

Referring to FIG. 3B, at step 305, customer authentication computing platform 110 may generate one or more authentication prompts (e.g., based on the authentication request received from customer computing device 180 at step 304, based on one or more authentication rules, and/or the like). In generating such authentication prompts, customer authentication computing platform 110 may, for example, create and/or form one or more prompts to be answered by the user of customer computing device 180 based on one or more authentication prompt templates, similar to how such authentication prompts may be generated in the example event sequence discussed above.

At step 306, customer authentication computing platform 110 may provide the one or more authentication prompts. For example, in providing the one or more authentication prompts at step 306, customer authentication computing platform 110 may send one or more authentication prompts to customer computing device 180 that request the user of customer computing device 180 to enter and/or otherwise provide a username, a password, one or more responses to one or more security questions, a one-time passcode, biometric input, and/or the like. At step 307, customer authentication computing platform 110 may validate one or more responses to the one or more authentication prompts. For example, at step 307, customer authentication computing platform 110 may validate one or more responses to the one or more authentication prompts and/or other authentication input received from customer computing device 180. In validating such authentication input, customer authentication computing platform 110 may, for instance, determine whether a username and/or password entered by the user of customer computing device 180 are correct, whether an indication of biometric input received from the user of customer computing device 180 was determined to be valid by customer computing device 180, whether one or more responses to one or more challenge questions entered by the user of customer computing device 180 are valid, whether a one-time passcode entered by the user of customer computing device 180 is valid, and/or whether other authentication input entered and/or otherwise provided by the user of customer computing device 180 is valid. If such authentication input information is determined by customer authentication computing platform 110 to be invalid and/or otherwise incorrect, customer authentication computing platform 110 may generate and/or send one or more error messages to customer computing device 180 and/or may prevent and/or deny access to customer computing device 180. Alternatively, if such authentication input information is determined by customer authentication computing platform 110 to be valid and/or otherwise correct, the event sequence may continue as illustrated in FIG. 3B (e.g., and customer authentication computing platform 110 may allow and/or otherwise provide access to customer computing device 180, as illustrated below).

At step 308, customer authentication computing platform 110 may provide access to account information (e.g., based on validating the one or more responses to the one or more authentication prompts at step 307). For example, at step 308, customer authentication computing platform 110 may provide customer computing device 180 and/or the user of customer computing device 180 with access to customer account information associated with an online banking account to which the user of customer computing device 180 has been authenticated. In providing access to such information, customer authentication computing platform 110 may, for instance, send, provide, and/or allow customer computing device 180 and/or the user of customer computing device 180 to access account information via a customer portal, an online banking portal (which may, e.g., be provided by customer portal computer system 120 and/or may allow the user of customer computing device 180 to access and/or view account information maintained by account management computer system 130), a mobile banking application, and/or the like.

Referring to FIG. 3C, at step 309, customer authentication computing platform 110 may store login history information (e.g., based on providing access to the account information at step 308). For example, prior to receiving an authentication request for a user account from a customer mobile device (e.g., as described below), customer authentication computing platform 110 may store login history information for the user account based on authenticating a user to the user account. For instance, in storing such login history information for the user account, customer authentication computing platform 110 may store information identifying which device was used in authenticating to and/or accessing the user account (e.g., customer computing device 180 in this example), information identifying which channel was used in authenticating to and/or accessing the user account (e.g., an online banking channel in this example), and/or other information associated with the particular login attempt in which the user was authenticated to the user account. In some instances, customer authentication computing platform 110 may store and/or maintain login history information that identifies and/or includes details about one or more previous mobile banking sessions (which may, e.g., involve a user being authenticated to the user account via a smart phone, smart watch, or the like), one or more previous online banking sessions (which may, e.g., involve a user being authenticated via a desktop computer, a web browser, or the like), one or more previous in-person banking sessions (which may, e.g., involve a customer being authenticated in a banking center by a retail associate), one or more previous telephone call-in sessions (which may, e.g., involve a customer being authenticated over the phone by a customer service representative), one or more previous automated teller device sessions (which may, e.g., involve a customer being authenticated at an automated teller machine, an automated teller assistant, or the like), and/or one or more other previous sessions.

At step 310, customer authentication computing platform 110 may monitor portal usage. For example, at step 310, customer authentication computing platform 110 may monitor usage of a customer portal (e.g., an online banking portal) via which access to account information is provided at step 308. In monitoring usage of the customer portal, customer authentication computing platform 110 may, for instance, record one or more actions requested and/or completed via the customer portal, store information identifying such actions, information identifying what times such actions were requested, information identifying what times such actions were completed, information identifying the results of such actions, information identifying other inputs and/or outputs provided, and/or other information associated with the usage of the customer portal.

At step 311, customer authentication computing platform 110 may store usage history information (e.g., based on the portal usage monitored at step 310). For example, at step 311, customer authentication computing platform 110 may store usage history information for the user account based on monitoring usage of the user account during a usage session. For instance, customer authentication computing platform 110 may store and/or update usage history information for the user account at step 311 based on monitoring portal usage at step 310. Such usage history information may, for instance, include information identifying what actions and/or transactions were requested and/or completed during the usage session and/or may include information identifying what actions and/or transactions were requested and/or completed during one or more previous usage sessions (e.g., during one or more previous online banking portal sessions).

Figure 3D:
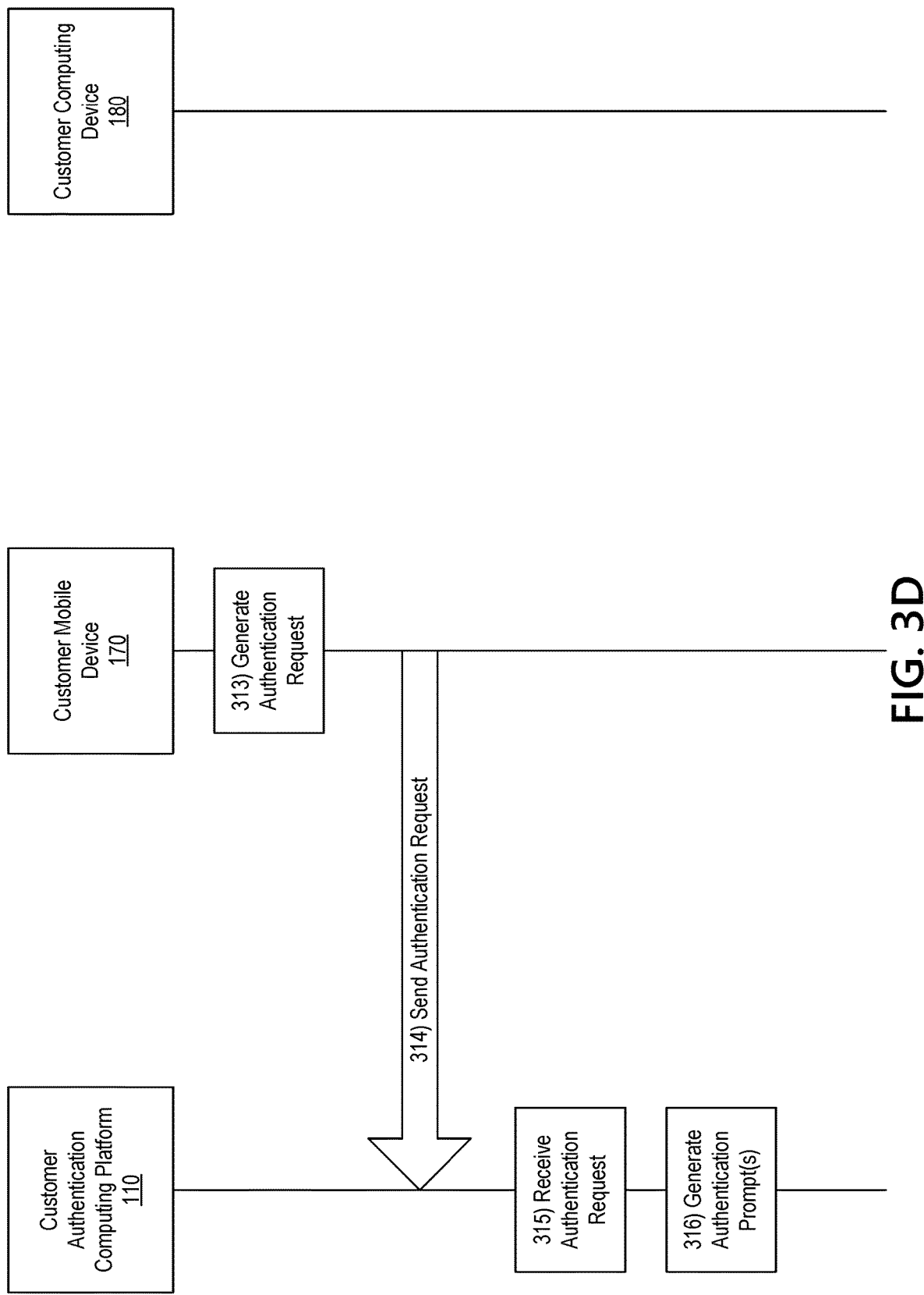

At step 312, customer mobile device 170 may receive input requesting to authenticate. For example, at step 312, customer mobile device 170 may receive input from a user of customer mobile device 170 requesting to authenticate to an online banking portal, a mobile banking application, and/or the like. Referring to FIG. 3D, at step 313, customer mobile device 170 may generate an authentication request (e.g., based on the input requesting to authenticate received by customer mobile device 170 from the user of customer mobile device 170 at step 312). At step 314, customer mobile device 170 may send the authentication request to customer authentication computing platform 110.

At step 315, customer authentication computing platform 110 may receive the authentication request from customer mobile device 170. For example, at step 315, customer authentication computing platform 110 may receive, via the communication interface (e.g., communication interface 116), and from a customer mobile device (e.g., customer mobile device 170), an authentication request for a user account.

In some embodiments, the authentication request for the user account may include information requesting to authenticate a user of the customer mobile device as a customer of a financial institution using one or more credentials of an online banking account maintained by the financial institution for the customer and accessible via an online banking portal provided by the financial institution. For example, the authentication request for the user account may include information requesting to authenticate a user of the customer mobile device (e.g., customer mobile device 170) as a customer of a financial institution using one or more credentials of an online banking account maintained by the financial institution for the customer and accessible via an online banking portal provided by the financial institution. In some instances, the online banking portal may be configured to provide the customer of the financial institution with access to account information, may allow the customer of the financial institution to view account balances, may allow the customer of the financial institution to request and/or execute one or more transactions, including one or more transfer transactions, one or more bill pay transactions, and/or the like. Additionally or alternatively, the online banking portal may be hosted and/or otherwise provided by customer portal computer system 120, as discussed above.

At step 316, customer authentication computing platform 110 may generate one or more authentication prompts (e.g., based on the authentication request received from customer mobile device 170 at step 315, based on one or more authentication rules, and/or the like, similar to how such authentication prompts may be generated in the examples discussed above). For example, at step 316, based on receiving the authentication request for the user account from the customer mobile device (e.g., customer mobile device 170), customer authentication computing platform 110 may generate one or more authentication prompts based on one or more authentication rules. In generating the set of one or more authentication prompts, customer authentication computing platform 110 may, for instance, select one or more predefined authentication prompts from a set of predefined authentication prompts based on the authentication rules defined for an online banking channel and/or a mobile banking channel (which may, e.g., be associated with customer portal computer system 120). Such a set of predefined authentication prompts may, for example, include one or more predefined authentication prompts that request a customer or user to provide a username, a password, a one-time passcode, one or more responses to one or more challenge questions, biometric input, and/or the like. In addition, one or more channel-specific rules (e.g., the set of authentication rules defined for the online banking channel and/or the mobile banking channel) may dictate which prompts of the set of predefined authentication prompts are to be selected by customer authentication computing platform 110 depending on the device and/or the type of device requesting access to account information, depending on the user and/or the type of user requesting access to account information, depending on the location of the user and/or the device requesting access to account information, depending on the current time of day at which access to account information is requested, and/or based on one or more other factors. In some instances, the customer or user requesting access to account information may be authenticated (e.g., by customer authentication computing platform 110) using a combination of online banking credentials and/or one or more channel-specific authentication processes and/or policies (which may, e.g., be specific to the online banking channel and/or the mobile banking channel associated with customer portal computer system 120).

Referring to FIG. 3E, at step 317, customer authentication computing platform 110 may provide the one or more authentication prompts. For example, at step 317, customer authentication computing platform 110 may provide the one or more authentication prompts generated based on the one or more authentication rules. In providing the set of one or more authentication prompts, customer authentication computing platform 110 may, for instance, send one or more authentication prompts to customer mobile device 170 and/or to one or more other devices, such as a registered mobile device linked to the user account to which the user of customer mobile device 170 is requesting access. For example, customer authentication computing platform 110 may send one or more authentication prompts to customer mobile device 170 that request the user of customer mobile device 170 (who may, e.g., be a customer of a financial institution) to provide their online banking username, one or more responses to one or more security questions, a one-time passcode, and/or the like. Additionally or alternatively, customer authentication computing platform 110 may send a one-time passcode and/or a biometric input prompt to a registered mobile device linked to the user account to which the user of customer mobile device 170 is requesting access (which may, e.g., be customer mobile device 170).

In some embodiments, providing the one or more authentication prompts generated based on the one or more authentication rules may include sending, via the communication interface, and to the customer mobile device, a prompt to provide a username and password for the user account. For example, in providing the one or more authentication prompts generated based on the one or more authentication rules, customer authentication computing platform 110 may send, via the communication interface (e.g., communication interface 116), and to the customer mobile device (e.g., customer mobile device 170), a prompt to provide a username and password for the user account.

In some embodiments, providing the one or more authentication prompts generated based on the one or more authentication rules may include sending, via the communication interface, and to a mobile computing device registered with the user account, a one-time passcode. For example, in providing the one or more authentication prompts generated based on the one or more authentication rules, customer authentication computing platform 110 may send, via the communication interface (e.g., communication interface 116), and to a mobile computing device registered with the user account (which may, e.g., be customer mobile device 170), a one-time passcode. Subsequently, customer authentication computing platform 110 may prompt the user of the customer mobile device (e.g., customer mobile device 170) to enter and/or otherwise provide the one-time passcode that was sent to the mobile computing device registered with the user account for verification.

In some embodiments, providing the one or more authentication prompts generated based on the one or more authentication rules may include sending, via the communication interface, and to a mobile computing device registered with the user account, a biometric input prompt. For example, in providing the one or more authentication prompts generated based on the one or more authentication rules, customer authentication computing platform 110 may send, via the communication interface (e.g., communication interface 116), and to a mobile computing device registered with the user account (which may, e.g., be customer mobile device 170), a biometric input prompt. In some instances, the biometric input prompt may prompt the user of a mobile computing device registered with the user account (which may, e.g., be customer mobile device 170) to provide biometric input for validation (e.g., fingerprint biometric input, voice biometric input, facial scan biometric input, retinal scan biometric input, and/or other biometric input), and such biometric input may be validated by the mobile computing device registered with the user account (which may, e.g., be customer mobile device 170) and/or by customer authentication computing platform 110. For instance, customer authentication computing platform 110 may receive biometric validation input that includes the actual biometric input provided by the user of customer mobile device 170 (e.g., to be validated by customer authentication computing platform 110 itself) and/or an indication from customer mobile device 170 that the biometric input provided by the user of customer mobile device 170 was confirmed to be valid (e.g., by customer mobile device 170 itself).

At step 318, customer authentication computing platform 110 may validate one or more responses to the one or more authentication prompts. For example, at step 318, customer authentication computing platform 110 may validate one or more responses to the one or more authentication prompts generated based on the one or more authentication rules. For example, at step 318, customer authentication computing platform 110 may validate one or more responses to the one or more authentication prompts and/or other authentication input received from customer mobile device 170. In validating such authentication input, customer authentication computing platform 110 may, for instance, determine whether a username and/or password entered by the user of customer mobile device 170 are correct, whether an indication of biometric input received from the user of customer mobile device 170 was determined to be valid by customer mobile device 170, whether one or more responses to one or more challenge questions entered by the user of customer mobile device 170 are valid, whether a one-time passcode entered by the user of customer mobile device 170 is valid, and/or whether other authentication input entered and/or otherwise provided by the user of customer mobile device 170 is valid. If such authentication input information is determined by customer authentication computing platform 110 to be invalid and/or otherwise incorrect, customer authentication computing platform 110 may generate and/or send one or more error messages to customer mobile device 170 and/or may prevent and/or deny access to customer mobile device 170. Alternatively, if such authentication input information is determined by customer authentication computing platform 110 to be valid and/or otherwise correct, the event sequence may continue as illustrated in FIG. 3E (e.g., and customer authentication computing platform 110 may generate and/or provide one or more security question prompts based on login history information, authentication history information, and/or other historical information, as illustrated below).

At step 319, customer authentication computing platform 110 may generate one or more security question prompts (e.g., based on login history information, based on usage history information, and/or based on other historical information). For example, based on validating the one or more responses to the one or more authentication prompts generated based on the one or more authentication rules, customer authentication computing platform 110 may generate one or more security questions based on historical information associated with the user account. In generating such security questions, customer authentication computing platform 110 may, for example, create and/or form one or more security question prompts to be answered by the user of customer mobile device 170 based on one or more authentication prompt templates. Such templates may, for instance, include one or more variable fields in which historical information may be inserted by customer authentication computing platform 110 in order to form the security questions (e.g., "Did you access your <variable field: channel> account on <variable field: date>?," "Did you use your <variable field: device> to access your <variable field: channel> account on <variable field: date>?," and/or the like). In some instances, in addition to generating such security questions based on a customer's online banking history information, customer authentication computing platform 110 may likewise generate one or more security questions based on a customer's telephone banking history information, a customer's in-person banking history information, a customer's automated teller device banking history information, and/or other banking history information associated with a customer's interactions with an organization via one or more channels and/or devices.

In some embodiments, the historical information associated with the user account may include login history information associated with the user account. For example, the historical information associated with the user account (which may, e.g., be used by customer authentication computing platform 110 in generating one or more security questions at step 319) may include login history information associated with the user account.

In some embodiments, the login history information associated with the user account may include device information identifying at least one device that was previously used to access the user account. For example, the login history information associated with the user account (which may, e.g., be used by customer authentication computing platform 110 in generating one or more security questions at step 319) may include device information identifying at least one device that was previously used to access the user account. Such device information may, for instance, include one or more unique identifiers, serial numbers, device type indicators, device names and/or model numbers, and/or other identifiers identifying one or more specific computing devices that were previously used to access the user account (which may, e.g., be an online banking account, a mobile banking account, or the like), such as one or more particular smart phones, smart watches, laptop computers, desktop computers, and/or the like. Additionally or alternatively, the login history information associated with the user account (which may, e.g., be used by customer authentication computing platform 110 in generating one or more security questions at step 319) may include time and/or date information identifying the specific times and/or dates when specific devices were used to access the user account.

In some embodiments, the login history information associated with the user account may include channel information identifying at least one channel that was previously used to access the user account. For example, the login history information associated with the user account (which may, e.g., be used by customer authentication computing platform 110 in generating one or more security questions at step 319) may include channel information identifying at least one channel that was previously used to access the user account. Such channel information may, for instance, include one or more channel identifiers and/or other identifiers identifying one or more specific channels that were used by one or more specific devices in accessing the user account, as well as time and/or date information identifying the specific times and/or dates when such devices accessed the user account via the specific channels. For example, the channel information may include information indicating that the user account was accessed on one or more specific times and/or dates via an online banking channel, via a mobile banking channel, via a telephone banking channel, via an in-person banking channel, via an automated teller device channel, and/or via one or more other channels.

In some embodiments, the historical information associated with the user account may include usage history information associated with the user account. For example, the historical information associated with the user account (which may, e.g., be used by customer authentication computing platform 110 in generating one or more security questions at step 319) may include usage history information associated with the user account.

In some embodiments, the usage history information associated with the user account may include action information identifying one or more actions that were previously performed during a usage session of the user account. For example, the usage history information associated with the user account (which may, e.g., be used by customer authentication computing platform 110 in generating one or more security questions at step 319) may include action information identifying one or more actions that were previously performed during a usage session of the user account. Such action information may, for instance, include information identifying one or more specific transactions that were requested and/or performed at one or more specific times and/or dates (e.g., during a previous online banking session, mobile banking session, telephone banking session, in-person banking session, automated teller device banking session, or the like), one or more specific forms and/or other pages that were viewed and/or modified at one or more specific times and/or dates, and/or other information that was viewed, created, and/or modified at one or more specific times and/or dates during one or more previous usage sessions of the user account. Any and/or all of this information may form the basis of security questions generated by customer authentication computing platform 110 at step 319.

At step 320, customer authentication computing platform 110 may provide the one or more security question prompts. For example, at step 320, customer authentication computing platform 110 may provide the one or more security questions generated based on the historical information associated with the user account. In some embodiments, providing the one or more security questions generated based on the historical information associated with the user account may include sending, via the communication interface, and to the customer mobile device, a prompt to respond to the one or more security questions generated based on the historical information associated with the user account. For example, in providing the one or more security questions generated based on the historical information associated with the user account, customer authentication computing platform 110 may send, via the communication interface (e.g., communication interface 116), and to the customer mobile device (e.g., customer mobile device 170), a prompt to respond to the one or more security questions generated based on the historical information associated with the user account.

In some instances, in providing the one or more security questions generated based on the historical information associated with the user account (e.g., at step 320), customer authentication computing platform 110 may cause customer mobile device 170 to display and/or otherwise present one or more graphical user interfaces. For example, in providing the one or more security questions generated based on the historical information associated with the user account (e.g., at step 320), customer authentication computing platform 110 may cause customer mobile device 170 to display and/or otherwise present a graphical user interface similar to graphical user interface 700, which is illustrated in FIG. 7. As seen in FIG. 7, graphical user interface 700 may include information prompting the user of customer mobile device 170 to answer one or more security questions that have been generated by customer authentication computing platform 110 based on login history associated with the user account that the user of customer mobile device 170 is attempting to access. For instance, in the example shown in FIG. 7, graphical user interface 700 includes information prompting the user of customer mobile device 170 to answer a security question asking the user of customer mobile device 170 to identify a specific device that was previously used to access the user account on a specific date.

As another example, in providing the one or more security questions generated based on the historical information associated with the user account (e.g., at step 320), customer authentication computing platform 110 may cause customer mobile device 170 to display and/or otherwise present a graphical user interface similar to graphical user interface 800, which is illustrated in FIG. 8. As seen in FIG. 8, graphical user interface 800 may include information prompting the user of customer mobile device 170 to answer one or more security questions that have been generated by customer authentication computing platform 110 based on login history associated with the user account that the user of customer mobile device 170 is attempting to access. For instance, in the example shown in FIG. 8, graphical user interface 800 includes information prompting the user of customer mobile device 170 to answer a security question asking the user of customer mobile device 170 to identify a specific channel that was previously used to access the user account on a specific date.

As another example, in providing the one or more security questions generated based on the historical information associated with the user account (e.g., at step 320), customer authentication computing platform 110 may cause customer mobile device 170 to display and/or otherwise present a graphical user interface similar to graphical user interface 900, which is illustrated in FIG. 9. As seen in FIG. 9, graphical user interface 900 may include information prompting the user of customer mobile device 170 to answer one or more security questions that have been generated by customer authentication computing platform 110 based on usage history associated with the user account that the user of customer mobile device 170 is attempting to access. For instance, in the example shown in FIG. 9, graphical user interface 900 includes information prompting the user of customer mobile device 170 to answer a security question asking the user of customer mobile device 170 to identify a specific action that was previously performing during a usage session of the user account on a specific date.

Referring to FIG. 3F, at step 321, customer authentication computing platform 110 may validate one or more responses to the one or more security question prompts. For example, at step 321, customer authentication computing platform 110 may validate one or more responses to the one or more security questions generated based on the historical information associated with the user account. In validating such responses, customer authentication computing platform 110 may, for instance, determine whether and/or confirm that the user of customer mobile device 170 answered the one or more security questions correctly and/or otherwise provided valid input in response to the one or more security questions. If such security question input information is determined by customer authentication computing platform 110 to be invalid and/or otherwise incorrect, customer authentication computing platform 110 may generate and/or send one or more error messages to customer mobile device 170 and/or may prevent and/or deny access to customer mobile device 170. Alternatively, if such security question input information is determined by customer authentication computing platform 110 to be valid and/or otherwise correct, the event sequence may continue as illustrated in FIG. 3F (e.g., and customer authentication computing platform 110 may allow and/or otherwise provide access to customer mobile device 170, as illustrated below).

At step 322, customer authentication computing platform 110 may provide access to account information (e.g., based on validating the one or more responses to the one or more security question prompts at step 321). For example, at step 322, based on validating the one or more responses to the one or more security questions generated based on the historical information associated with the user account, customer authentication computing platform 110 may provide user account information associated with the user account to the customer mobile device (e.g., customer mobile device 170). In providing access to such account information, customer authentication computing platform 110 may, for instance, send, provide, and/or allow customer mobile device 170 and/or the user of customer mobile device 170 to access account information via a customer portal, an online banking portal (which may, e.g., be provided by customer portal computer system 120 and/or may allow the user of customer mobile device 170 to access and/or view account information maintained by account management computer system 130), a mobile banking application (which may, e.g., interact with and/or be provided by an online banking portal associated with customer portal computer system 120 and/or may allow the user of customer mobile device 170 to access and/or view account information maintained by account management computer system 130), and/or the like. Such account information may, for instance, be specific and/or personal to the user of customer mobile device 170.

In some embodiments, providing the user account information associated with the user account to the customer mobile device may include enabling the customer mobile device to access to the online banking portal provided by the financial institution. For example, in providing the user account information associated with the user account to the customer mobile device (e.g., customer mobile device 170), customer authentication computing platform 110 may enable the customer mobile device (e.g., customer mobile device 170) to access to the online banking portal provided by the financial institution (which may, e.g., be provided by customer portal computer system 120). In enabling the customer mobile device (e.g., customer mobile device 170) to access to the online banking portal provided by the financial institution, customer authentication computing platform 110 may, for instance, serve, transmit, and/or otherwise provide one or more user interfaces and/or other pages to the customer mobile device (e.g., customer mobile device 170) that may be configured to allow the user of the customer mobile device (e.g., customer mobile device 170) to view account balances, request one or more transactions, and/or otherwise access and/or interact with the user account information associated with the user account.

At step 323, customer authentication computing platform 110 may store login history information (e.g., based on providing access to the account information at step 322). For example, at step 323, customer authentication computing platform 110 may store updated login history information for the user account based on providing the user account information associated with the user account to the customer mobile device (e.g., customer mobile device 170). For instance, in storing such login history information for the user account, customer authentication computing platform 110 may store information identifying which device was used in authenticating to and/or accessing the user account (e.g., customer mobile device 170 in this example), information identifying which channel was used in authenticating to and/or accessing the user account (e.g., an online banking channel in this example), and/or other information associated with the particular login attempt in which the user was authenticated to the user account. Such updated login history information may, for instance, be stored by customer authentication computing platform 110 based on customer authentication computing platform 110 providing customer mobile device 170 with access to the online banking account and/or the online banking portal at step 322. Additionally or alternatively, the updated login history information for the user account may be used by customer authentication computing platform 110 in the future when generating security questions for a future login attempt.

At step 324, customer authentication computing platform 110 may monitor portal usage. For example, at step 324, customer authentication computing platform 110 may monitor usage of a customer portal (e.g., an online banking portal) via which access to account information is provided at step 322. In monitoring usage of the customer portal, customer authentication computing platform 110 may, for instance, record one or more actions requested and/or completed via the customer portal, store information identifying such actions, information identifying what times such actions were requested, information identifying what times such actions were completed, information identifying the results of such actions, information identifying other inputs and/or outputs provided, and/or other information associated with the usage of the customer portal.

Referring to FIG. 3G, at step 325, customer authentication computing platform 110 may store usage history information (e.g., based on the portal usage monitored at step 324). For example, at step 325, customer authentication computing platform 110 may store updated usage history information for the user account based on providing the user account information associated with the user account to the customer mobile device (e.g., customer mobile device 170). For instance, customer authentication computing platform 110 may store and/or update usage history information for the user account at step 325 based on monitoring portal usage at step 324. Such usage history information may, for instance, include information identifying what actions and/or transactions were requested and/or completed during the usage session and/or may include information identifying what actions and/or transactions were requested and/or completed during one or more previous usage sessions (e.g., during one or more previous online banking portal sessions). Additionally or alternatively, the usage history information may, for instance, include information identifying one or more specific transactions that were requested and/or performed at one or more specific times and/or dates, one or more specific forms and/or other pages that were viewed and/or modified at one or more specific times and/or dates, and/or other information that was viewed, created, and/or modified at one or more specific times and/or dates during the usage session of the user account. Such updated usage history information may, for instance, be stored by customer authentication computing platform 110 based on customer authentication computing platform 110 providing customer mobile device 170 with access to the online banking account and/or the online banking portal at step 322. Additionally or alternatively, the updated usage history information for the user account may be used by customer authentication computing platform 110 in the future when generating security questions for a future login attempt.

In one or more arrangements, one or more security questions may be similarly generated and/or provided to one or more other systems based on historical information in other contexts. For example, customer authentication computing platform 110 may perform one or more steps of the example event sequence discussed above to generate one or more security questions based on historical information, and customer authentication computing platform 110 may provide such security questions to telephone agent support computer system 150 and/or banking center agent support computer system 160 to authenticate a customer via one or more other channels, such as a telephone banking channel associated with telephone agent support computer system 150 and/or an in-person banking channel associated with banking center agent support computer system 160.

Figure 10:
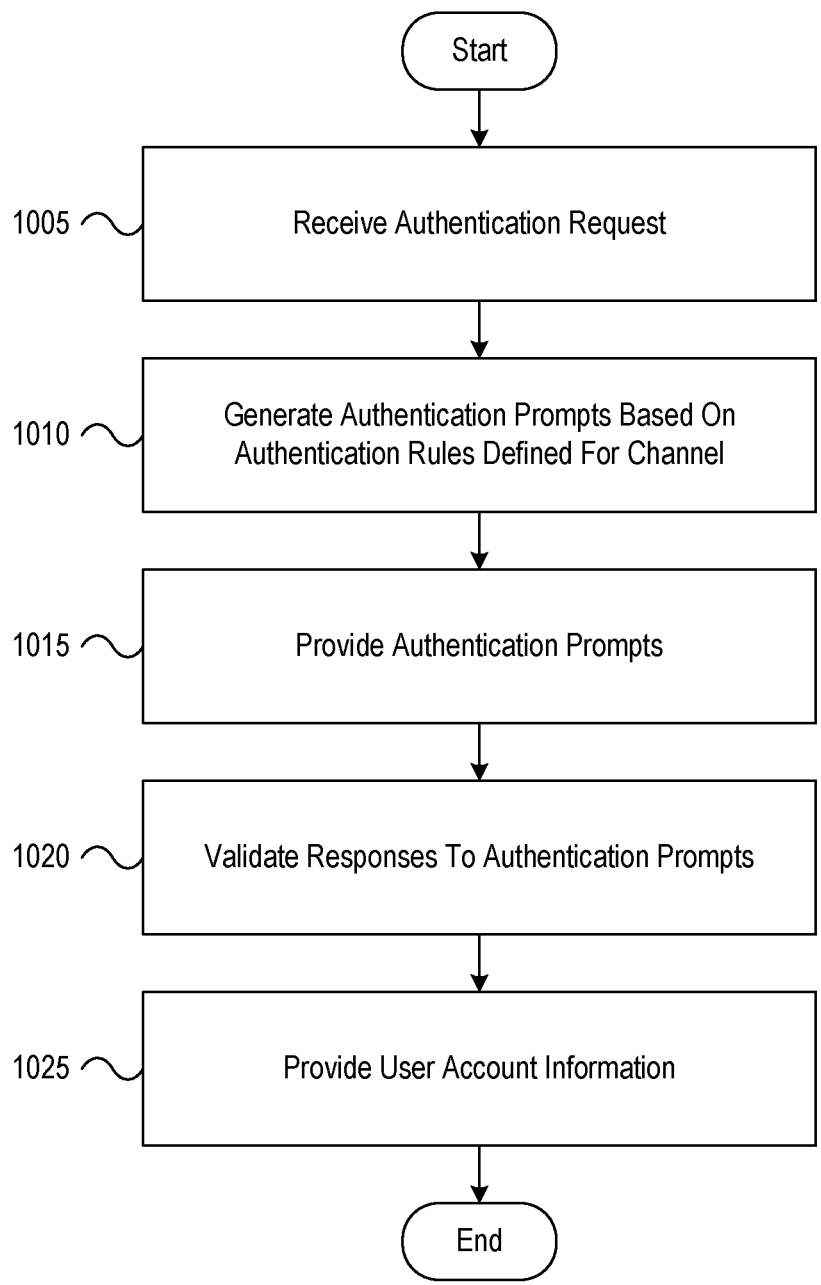
FIG. 10 depicts an illustrative method for linking channel-specific systems with a user authentication hub to provide omni-channel user authentication in accordance with one or more example embodiments.

FIG. 10 depicts an illustrative method for linking channel-specific systems with a user authentication hub to provide omni-channel user authentication in accordance with one or more example embodiments. Referring to FIG. 10, at step 1005, a computing platform having at least one processor, a communication interface, and a memory may receive, via the communication interface, and from a telephone agent support computer system associated with a telephone agent channel, an authentication request for a user account. At step 1010, based on receiving the authentication request from the telephone agent support computer system associated with the telephone agent channel, the computing platform may generate a set of one or more authentication prompts based on a set of authentication rules defined for the telephone agent channel. At step 1015, the computing platform may provide the set of one or more authentication prompts generated based on the set of authentication rules defined for the telephone agent channel. At step 1020, the computing platform may validate one or more responses to the set of one or more authentication prompts generated based on the set of authentication rules defined for the telephone agent channel. At step 1025, based on validating the one or more responses to the set of one or more authentication prompts generated based on the set of authentication rules defined for the telephone agent channel, the computing platform may provide user account information associated with the user account to the telephone agent support computer system associated with the telephone agent channel.

Figure 11:
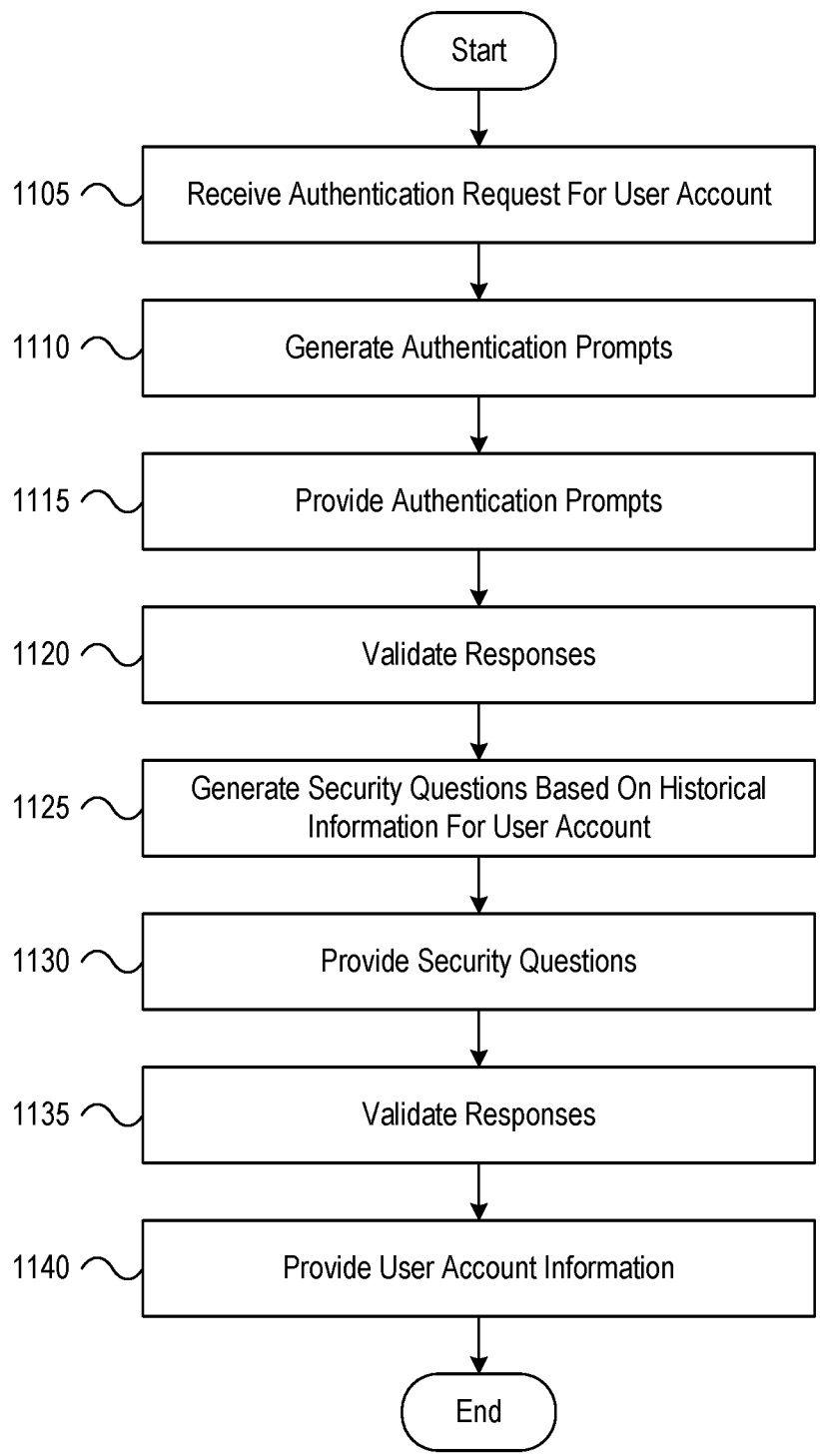
FIG. 11 depicts an illustrative method for dynamically authenticating end user clients using historical information in accordance with one or more example embodiments.

FIG. 11 depicts an illustrative method for dynamically authenticating end user clients using historical information in accordance with one or more example embodiments. Referring to FIG. 11, at step 1105, a computing platform having at least one processor, a communication interface, and a memory may receive, via the communication interface, and from a customer mobile device, an authentication request for a user account. At step 1110, based on receiving the authentication request for the user account from the customer mobile device, the computing platform may generate one or more authentication prompts based on one or more authentication rules. At step 1115, the computing platform may provide the one or more authentication prompts generated based on the one or more authentication rules. At step 1120, the computing platform may validate one or more responses to the one or more authentication prompts generated based on the one or more authentication rules. At step 1125, based on validating the one or more responses to the one or more authentication prompts generated based on the one or more authentication rules, the computing platform may generate one or more security questions based on historical information associated with the user account. At step 1130, the computing platform may provide the one or more security questions generated based on the historical information associated with the user account. At step 1135, the computing platform may validate one or more responses to the one or more security questions generated based on the historical information associated with the user account. At step 1140, based on validating the one or more responses to the one or more security questions generated based on the historical information associated with the user account, the computing platform may provide user account information associated with the user account to the customer mobile device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   at least one processor;
   a communication interface communicatively coupled to the at least one processor; and
   memory storing computer-readable instructions that, when executed by the at least one processor, cause the system to:
   receive, via the communication interface, and from a first computer system associated with a telephone agent channel, an authentication request for a user account;
   based on receiving the authentication request from the first computer system associated with the telephone agent channel, generate a set of one or more authentication prompts based on a set of authentication rules defined for the telephone agent channel;
   provide the set of one or more authentication prompts generated based on the set of authentication rules defined for the telephone agent channel;
   validate one or more responses to the set of one or more authentication prompts generated based on the set of authentication rules defined for the telephone agent channel; and
   based on validating the one or more responses to the set of one or more authentication prompts generated based on the set of authentication rules defined for the telephone agent channel, provide user account information associated with the user account to the first computer system associated with the telephone agent channel,
   wherein the authentication request comprises information requesting to authenticate a caller as a customer of a financial institution using one or more credentials of an online banking account associated with the customer,
   wherein providing the set of one or more authentication prompts generated based on the set of authentication rules defined for the telephone agent channel comprises:
   sending, via the communication interface, and to the first computer system associated with the telephone agent channel, a message prompting a customer service representative using the first computer system associated with the telephone agent channel to ask the caller to provide a username associated with the online banking account,
   wherein providing the set of one or more authentication prompts generated based on the set of authentication rules defined for the telephone agent channel comprises:
   sending, via the communication interface, and to the first computer system associated with the telephone agent channel, a message prompting the customer service representative using the first computer system associated with the telephone agent channel to ask the caller to provide a response to a security question associated with the online banking account,
   wherein sending the message prompting the customer service representative using the first computer system associated with the telephone agent channel to ask the caller to provide the response to the security question associated with the online banking account comprises sending a message prompting the customer service representative using the first computer system associated with the telephone agent channel to ask the caller to provide a response to a security question associated with login history of the online banking account, and
   wherein providing the set of one or more authentication prompts generated based on the set of authentication rules defined for the telephone agent channel comprises:
   sending, via the communication interface, and to a client device registered to the customer of the financial institution, a one-time passcode; and sending, via the communication interface, and to the first computer system associated with the telephone agent channel, a message prompting the customer service representative using the first computer system associated with the telephone agent channel to ask the caller to provide the one-time passcode for verification over the phone.

2. The system of claim 1, wherein sending the message prompting the customer service representative using the first computer system associated with the telephone agent channel to ask the caller to provide the response to the security question associated with the login history of the online banking account comprises sending a message prompting the customer service representative using the first computer system associated with the telephone agent channel to ask the caller to identify a specific device that was previously used to access the online banking account on a specific date.

3. The system of claim 1, wherein providing the set of one or more authentication prompts generated based on the set of authentication rules defined for the telephone agent channel comprises:
   sending, via the communication interface, and to the client device registered to the customer of the financial institution, a biometric input prompt; and
   receiving, via the communication interface, and from the client device registered to the customer of the financial institution, biometric validation input.

4. The system of claim 1, wherein providing the set of one or more authentication prompts generated based on the set of authentication rules defined for the telephone agent channel comprises sending at least one authentication prompt to an omni-channel user interface component integrated into an application executed by the first computer system.

5. The system of claim 4, wherein providing the user account information associated with the user account to the first computer system associated with the telephone agent channel comprises sending at least a portion of the user account information associated with the user account to the omni-channel user interface component integrated into the application executed by the first computer system.

6. The system of claim 4, wherein providing the user account information associated with the user account to the first computer system associated with the telephone agent channel comprises sending a message indicating that the caller has been authenticated to the omni-channel user interface component integrated into the application executed by the first computer system.

7. The system of claim 1, wherein the memory stores additional computer-readable instructions that, when executed by the at least one processor, cause the system to:
   receive, via the communication interface, and from the first computer system associated with the telephone agent channel, an account update request; and
   update the online banking account based on the account update request received from the first computer system associated with the telephone agent channel.

8. The system of claim 1, wherein the memory stores additional computer-readable instructions that, when executed by the at least one processor, cause the system to:
   prior to receiving the authentication request from the first computer system associated with the telephone agent channel:
      receive, via the communication interface, and from an administrative computer system, authentication rules information defining the set of authentication rules for the telephone agent channel; and
      store the authentication rules information defining the set of authentication rules for the telephone agent channel received from the administrative computer system.

9. The system of claim 1, wherein the memory stores additional computer-readable instructions that, when executed by the at least one processor, cause the system to:
   receive, via the communication interface, and from a second computer system associated with a banking center channel, a second authentication request for a second user account;
   based on receiving the second authentication request for the second user account from the second computer system associated with the banking center channel, generate a second set of one or more authentication prompts based on a second set of authentication rules defined for the banking center channel;
   provide the second set of one or more authentication prompts generated based on the second set of authentication rules defined for the banking center channel;
   validate one or more responses to the second set of one or more authentication prompts generated based on the second set of authentication rules defined for the banking center channel; and
   based on validating the one or more responses to the second set of one or more authentication prompts generated based on the second set of authentication rules defined for the banking center channel, provide second user account information associated with the second user account to the second computer system associated with the banking center channel.

10. The system of claim 9, wherein the second authentication request comprises information requesting to authenticate a visitor to a banking center as a second customer of the financial institution using one or more credentials of a second online banking account maintained by the financial institution for the second customer.

11. The system of claim 10, wherein providing the second set of one or more authentication prompts generated based on the second set of authentication rules defined for the banking center channel comprises sending at least one authentication prompt to an omni-channel user interface component integrated into an application executed by the second computer system associated with the banking center channel.

12. The system of claim 11, wherein providing the second user account information associated with the second user account to the second computer system associated with the banking center channel comprises sending a message indicating that the visitor to the banking center has been authenticated to the omni-channel user interface component integrated into the application executed by the second computer system associated with the banking center channel.

13. A method comprising:
   at a computing platform comprising at least one processor, memory, and a communication interface:
      receiving, by the at least one processor, via the communication interface, and from a first computer system associated with a telephone agent channel, an authentication request for a user account;
      based on receiving the authentication request from the first computer system associated with the telephone agent channel, generating, by the at least one processor, a set of one or more authentication prompts based on a set of authentication rules defined for the telephone agent channel;

providing, by the at least one processor, the set of one or more authentication prompts generated based on the set of authentication rules defined for the telephone agent channel;

validating, by the at least one processor, one or more responses to the set of one or more authentication prompts generated based on the set of authentication rules defined for the telephone agent channel; and based on validating the one or more responses to the set of one or more authentication prompts generated based on the set of authentication rules defined for the telephone agent channel, providing, by the at least one processor, user account information associated with the user account to the first computer system associated with the telephone agent channel, wherein the authentication request comprises information requesting to authenticate a caller as a customer of a financial institution using one or more credentials of an online banking account associated with the customer, wherein providing the set of one or more authentication prompts generated based on the set of authentication rules defined for the telephone agent channel comprises:

sending, via the communication interface, and to the first computer system associated with the telephone agent channel, a message prompting a customer service representative using the first computer system associated with the telephone agent channel to ask the caller to provide a username associated with the online banking account, wherein providing the set of one or more authentication prompts generated based on the set of authentication rules defined for the telephone agent channel comprises:

sending, via the communication interface, and to the first computer system associated with the telephone agent channel, a message prompting the customer service representative using the first computer system associated with the telephone agent channel to ask the caller to provide a response to a security question associated with the online banking account, wherein sending the message prompting the customer service representative using the first computer system associated with the telephone agent channel to ask the caller to provide the response to the security question associated with the online banking account comprises sending a message prompting the customer service representative using the first computer system associated with the telephone agent channel to ask the caller to provide a response to a security question associated with login history of the online banking account, and wherein providing the set of one or more authentication prompts generated based on the set of authentication rules defined for the telephone agent channel comprises:

sending, via the communication interface, and to a client device registered to the customer of the financial institution, a one-time passcode; and sending, via the communication interface, and to the first computer system associated with the telephone agent channel, a message prompting the customer service representative using the first computer system associated with the telephone agent channel to ask the caller to provide the one-time passcode for verification over the phone.

14. The method of claim 13, wherein providing the set of one or more authentication prompts generated based on the set of authentication rules defined for the telephone agent channel comprises:

sending, via the communication interface, and to the client device registered to the customer of the financial institution, a biometric input prompt; and receiving, via the communication interface, and from the client device registered to the customer of the financial institution, biometric validation input.

15. The method of claim 13, wherein providing the set of one or more authentication prompts generated based on the set of authentication rules defined for the telephone agent channel comprises sending at least one authentication prompt to an omni-channel user interface component integrated into an application executed by the first computer system.

16. One or more non-transitory computer-readable media storing instructions that, when executed by a computer system comprising at least one processor, memory, and a communication interface, cause the computer system to:

receive, via the communication interface, and from a first computer system associated with a telephone agent channel, an authentication request for a user account;

based on receiving the authentication request from the first computer system associated with the telephone agent channel, generate a set of one or more authentication prompts based on a set of authentication rules defined for the telephone agent channel;

provide the set of one or more authentication prompts generated based on the set of authentication rules defined for the telephone agent channel;

validate one or more responses to the set of one or more authentication prompts generated based on the set of authentication rules defined for the telephone agent channel; and based on validating the one or more responses to the set of one or more authentication prompts generated based on the set of authentication rules defined for the telephone agent channel, provide user account information associated with the user account to the first computer system associated with the telephone agent channel, wherein the authentication request comprises information requesting to authenticate a caller as a customer of a financial institution using one or more credentials of an online banking account associated with the customer, wherein providing the set of one or more authentication prompts generated based on the set of authentication rules defined for the telephone agent channel comprises:

sending, via the communication interface, and to the first computer system associated with the telephone agent channel, a message prompting a customer service representative using the first computer system associated with the telephone agent channel to ask the caller to provide a username associated with the online banking account, wherein providing the set of one or more authentication prompts generated based on the set of authentication rules defined for the telephone agent channel comprises:

sending, via the communication interface, and to the first computer system associated with the telephone agent channel, a message prompting the customer service representative using the first computer system associated with the telephone agent channel to ask the caller to provide a response to a security question associated with the online banking account, wherein sending the message prompting the customer service representative using the first computer system associated with the telephone agent channel to ask the caller to provide the response to the security question associated with the online banking account comprises sending a message prompting the customer service representative using the first computer system associated with the telephone agent channel to ask the caller to provide a response to a security question associated with login history of the online banking account, and wherein providing the set of one or more authentication prompts generated based on the set of authentication rules defined for the telephone agent channel comprises:

sending, via the communication interface, and to a client device registered to the customer of the financial institution, a one-time passcode; and sending, via the communication interface, and to the first computer system associated with the telephone agent channel, a message prompting the customer service representative using the first computer system associated with the telephone agent channel to ask the caller to provide the one-time passcode for verification over the phone.

* * * * *